United States Patent [19]
Tan

[11] Patent Number: 5,077,805
[45] Date of Patent: Dec. 31, 1991

[54] HYBRID FEATURE-BASED AND TEMPLATE MATCHING OPTICAL CHARACTER RECOGNITION SYSTEM

[75] Inventor: Hin-Leong Tan, Rochester, N.Y.

[73] Assignee: Eastman Kodak Company, Rochester, N.Y.

[21] Appl. No.: 520,310

[22] Filed: May 7, 1990

[51] Int. Cl.⁵ .............................................. G06K 9/00
[52] U.S. Cl. ............................................. 382/7; 382/9; 382/30; 382/34
[58] Field of Search ................... 382/7, 9, 30, 34, 48, 382/61; 235/379

[56] References Cited

U.S. PATENT DOCUMENTS

| | | | |
|---|---|---|---|
| 3,165,718 | 1/1965 | Fleisher | 382/18 |
| 3,382,482 | 5/1968 | Greenly | 382/18 |
| 3,522,586 | 8/1970 | Kiji et al. | 382/18 |
| 4,087,790 | 5/1978 | Neff | 382/9 |
| 4,288,781 | 8/1981 | Sellner et al. | 382/7 |
| 4,408,342 | 10/1983 | Grabowski et al. | 382/9 |
| 4,441,204 | 4/1984 | Hanna | 382/7 |
| 4,454,610 | 6/1984 | Sziklai | 382/3 |
| 4,490,850 | 12/1984 | Nally et al. | 382/34 |
| 4,523,330 | 6/1985 | Cain | 382/7 |
| 4,545,070 | 10/1985 | Miyagawa et al. | 382/48 |
| 4,654,873 | 3/1987 | Fujisawa et al. | 382/9 |
| 4,710,822 | 12/1987 | Matsunawa | 382/51 |
| 4,773,099 | 9/1988 | Bokser | 382/14 |
| 4,817,166 | 3/1989 | Gonzalez et al. | 382/1 |
| 4,833,722 | 5/1989 | Morton et al. | 382/22 |
| 4,837,842 | 6/1989 | Holt | 382/26 |

Primary Examiner—David K. Moore
Assistant Examiner—Jose L. Couso
Attorney, Agent, or Firm—Dennis R. Arndt

[57] ABSTRACT

A feature-based character recognition identification and confidence level are determined for an unknown symbol. If the confidence level is within an intermediate range, the feature-based identification is confirmed by matching the unknown character with a reference template corresponding to the feature-based identification. If the confidence level is below the intermediate range, template matching character recognition is substituted in place of the feature-based identification. If the template matching recognition identifies more than one symbol, corresponding templates from a second set of templates having thicker character strokes are employed to resolve the ambiguity.

16 Claims, 11 Drawing Sheets

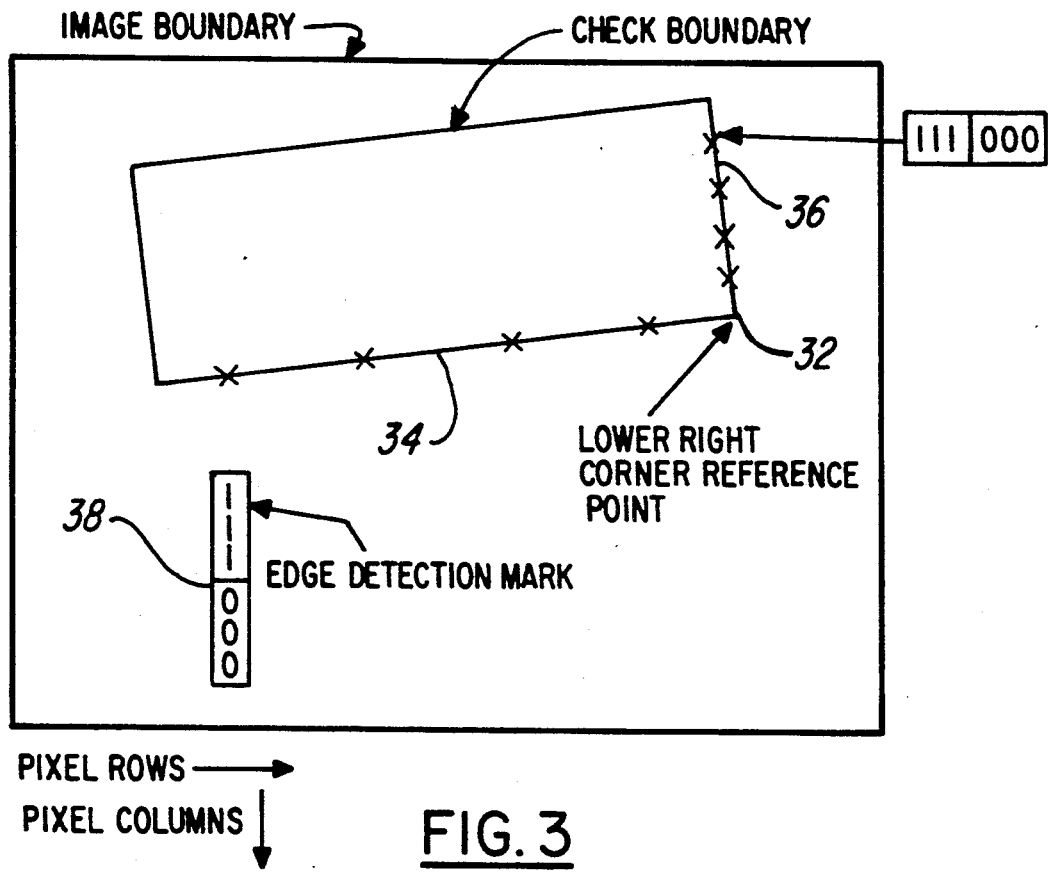

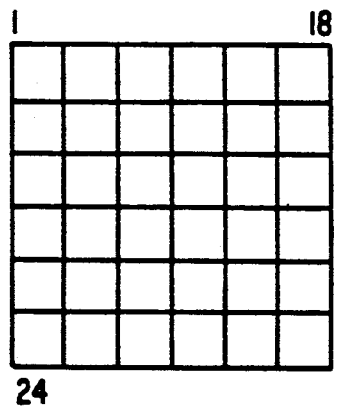
FIG.10A
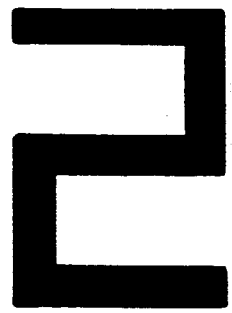
FIG.10B
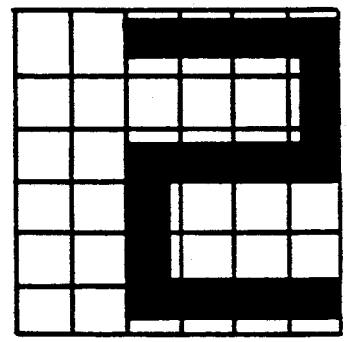
FIG.10C
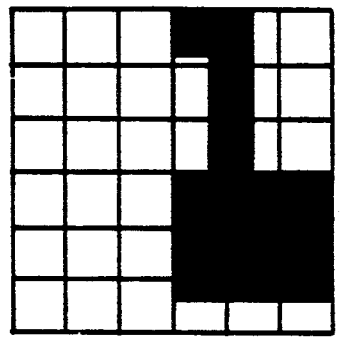
FIG.10D
| 0 | 0 | 0 | 12 | 6 | 0 |
|---|---|---|---|---|---|
| 0 | 0 | 0 | 6 | 6 | 0 |
| 0 | 0 | 0 | 6 | 6 | 0 |
| 0 | 0 | 0 | 12 | 12 | 12 |
| 0 | 0 | 0 | 12 | 12 | 12 |
| 0 | 0 | 0 | 6 | 6 | 6 |
FIG.10E
 THIN FROM N,S,E,W 
FIG.11

HYBRID FEATURE-BASED AND TEMPLATE MATCHING OPTICAL CHARACTER RECOGNITION SYSTEM

BACKGROUND OF THE INVENTION

A portion of the disclosure of this patent document contains material which is subject to copyright protection. The copyright owner has no objection to the facsimile reproduction by anyone of the patent document of the patent disclosure, as it appears i the Patent and Trademark Office patent file or records, but otherwise reserves all copyrights whatsoever.

1. Technical Field

The invention is related to high-speed optical character recognition systems and particularly to optical character recognition systems useful for reading magnetic image character recognition (MICR) symbols on a personal bank check.

2. Background Art

Identifying the image of an unknown pattern by matching it with a set of known reference patterns is a well-known technique, as disclosed in U.S. Pat. No. 3,165,718 (to Fleisher), for example. This type of technique is used in optical character recognition (OCR) systems. In one version, commonly referred to as feature-based optical character recognition, the unknown image is treated as a vector and the known reference patterns are likewise treated as reference vectors. Recognition is performed by associating the unknown vector with the one reference vector having the shortest absolute distance to the unknown vector. This technique is disclosed in U.S. Pat. No. 4,783,830 (to Johnson et al.) and similar techniques are disclosed in U.S. Pat. No. 3,522,586 (to Kiji et al.) and U.S. Pat. No. 3,382,482 (to Greenly). The use of multi-dimensional vector spaces in OCR systems is disclosed in U.S. Pat. No. 4,733,099 (to Bokser).

Another optical character recognition technique, commonly referred to as template matching, associates the unknown image with one of a set of known reference templates having the greatest similarity. Similarity is determined, for example, by the number of matching "on" and "off" pixels in the unknown image and the reference template. Template matching is disclosed in U.S. Pat. No. 4,288,781 (to Sellner et al.) and similar techniques are disclosed in U.S. Pat. No. 4,545,070 (to Miyagawa et al.), U.S. Pat. No. 4,454,610 (to Sziklai) and U.S. Pat. No. 4,837,842 (to Holt).

The computation of a confidence level to determine the validity of the character identification provided by such techniques is disclosed in U.S. Patent No. 4,288,781 (to Sellner et al.) discussed above. The confidence level defined in the latter patent is the ratio of the scores of the two highest scoring symbol identifications. Computation of confidence levels or values is also suggested in U.S. Pat. No. 4,733,099 (to Bokser) referred to above and U.S. Pat. No. 4,523,330 (to Cain). The latter patent suggests substituting an alternative manual character identification method if the confidence level is below a predetermined threshold.

U.S. Pat. No. 4,710,822 (to Matsunawa) discloses an image discrimination method based upon histogramming the pattern of the density of image elements in blocks into which the image has been divided. U.S. Pat. No. 4,833,722 (to Roger Morton et al.) discloses how to detect edges or boundaries in document images.

The feature-based OCR technique is superior to the template matching OCR technique because it is much faster. However, the feature-based OCR technique can be somewhat less reliable by failing to identify unknown character images more frequently than the template matching technique. Thus, the template matching technique is more reliable because it can identify unknown character images which the feature-based technique cannot. Accordingly, it has seemed that an OCR system could not enjoy the benefits of both speed and reliability because the system designer had to choose between a feature-based OCR system or a template matching OCR system.

One problem with template matching OCR systems is that the character stroke thickness of the reference templates affects the system performance. For example, a reference template with a thin character stroke is easier to match if pixels outside of the template character strokes are disregarded. This can lead to more than one symbol identification of an unknown character, or "aliasing". This problem is solved by considering the pixels outside of the reference template character strokes during the matching process, and demanding that these pixels be "off" in the unknown image. However, counting the outside pixels reduces the reliability of the template matching process, excluding unknown images which do not match simply because of the presence of noise in the image.

This problem is particularly severe if such an OCR system is employed to automatically read the machine-readable or MICR characters on a personal bank check. Such systems must perform flawlessly and must work at high speeds to keep pace with daily volume demands typical of most banking systems. In such systems, handwritten strokes through the MIRR characters are not uncommon and constitute sufficient noise to render the MICR characters unreadable using most conventional OCR techniques.

DISCLOSURE OF THE INVENTION

The invention is an OCR system particularly efficient at reading MICR characters on a personal bank check and which is immune to noise in the character image caused for example by handwritten strokes through the MICR characters. The OCR system of the invention enjoys the high speed of a feature-based OCR system with the reliability of a template matching OCR system, thus realizing the combined advantages of both types of systems in a single OCR system. The OCR system of the invention is useful for reading other documents, in addition to bank checks and MICR characters.

The OCR system of the invention employs the published ANSI specifications giving the location and identity of the first (leftmost) character of the MICR characters to find the leftmost character. The OCR system of the invention first finds the boundaries of the check and from the boundaries defines a general location of the leftmost MICR character. It then finds the exact location within the general location using the template of the leftmost MICR character. From this exact location, the locations of the next characters to the right are defined in succession based upon the location of the previous character. For this purpose, once each character has been successfully identified, its exact location is noted and used as a dead reckoning basis from which to estimate the location of the next character. This feature of the invention provides the fastest possible character location for most characters. These characters are read using a reading process of the invention.

The OCR system of the invention includes a reliable high speed hybrid character reading process combining the advantages of both template matching OCR techniques and feature-based OCR techniques. A feature-based recognition step is first performed to associate the unknown character with a symbol and a confidence score is computed for the symbol thus identified. This confidence score is the ratio of the absolute distances between the unknown image vector and the two closest reference vectors in a set of reference vectors representing the set of known symbols. If the confidence score is sufficiently high, the symbol identification is complete and the next symbol is read. Otherwise, if the confidence score is in an intermediate range, a template matching step is performed. In order to reduce the time required to perform template matching, the area in the unknown image in which template matching is performed is minimized. In order to increase the probability of matching an unknown image with the correct reference template, the character strokes of the reference templates are thinned with respect to the character strokes of the normal MICR characters. In order to render the system performance immune to noise such as handwritten strokes through the MICR characters, only pixels within the character strokes of the reference templates are considered during the template matching step. Pixels outside of the reference template character strokes are excluded from consideration. A match is declared if no more than a certain fraction of the pixels within the reference template character strokes are mismatched with the corresponding pixels in the unknown image.

If this step fails or if the confidence score previously computed was in the lowest range, the location of the unknown character is re-estimated based upon the known spacing of the MICR characters and the foregoing steps are repeated as necessary. If this fails, then the region in the unknown character image in which template matching is performed is increased and the foregoing steps are again repeated as necessary.

If any of the foregoing template matching attempts results in more than one reference template being matched with the unknown image, then corresponding candidate templates from a set of thicker (and therefore more stringent) reference templates are compared with the unknown image to reduce the aliasing. The thicker reference templates are more nearly the thickness of the normal MICR characters, but not quite as thick. Even though pixels mismatches outside of the reference template character strokes are excluded from consideration, the thicker set of reference templates will suppress aliasing to a greater extent because there are more pixels within the reference template character strokes which must match the pixels of the unknown image.

The system of the invention performs at maximum speed with maximum reliability because the progressively slower steps are performed only in specific instances of certain types of failures of the faster steps. Thus, a hierarchy of recognition steps is employed, the faster steps being performed more often than the slower steps and the slowest steps (repetitive template matching and re-estimation of character boundaries) are performed the least frequent of all and only in the ultimate cases of failure.

BRIEF DESCRIPTION OF THE DRAWINGS

Preferred embodiments of the invention are described in detail with reference to the accompanying drawings, of which:

FIG. 3 is a pictorial diagram illustrating how edge detection and corner location is performed in the invention;

FIG. 4 is a block diagram of the process of the invention for locating the boundary and corner locations of FIG. 3;

FIGS. 10a, 10b, 10c, 10d and 10e are pictorial diagrams illustrating different aspects of the featurebased recognition process of FIG. 9;

FIG. 11 is a pictorial diagram illustrating the generation of thinned reference templates from normal MICR characters in accordance with the invention;

MODES FOR CARRYING OUT THE INVENTION

Structure of the Invention

Figure 1:
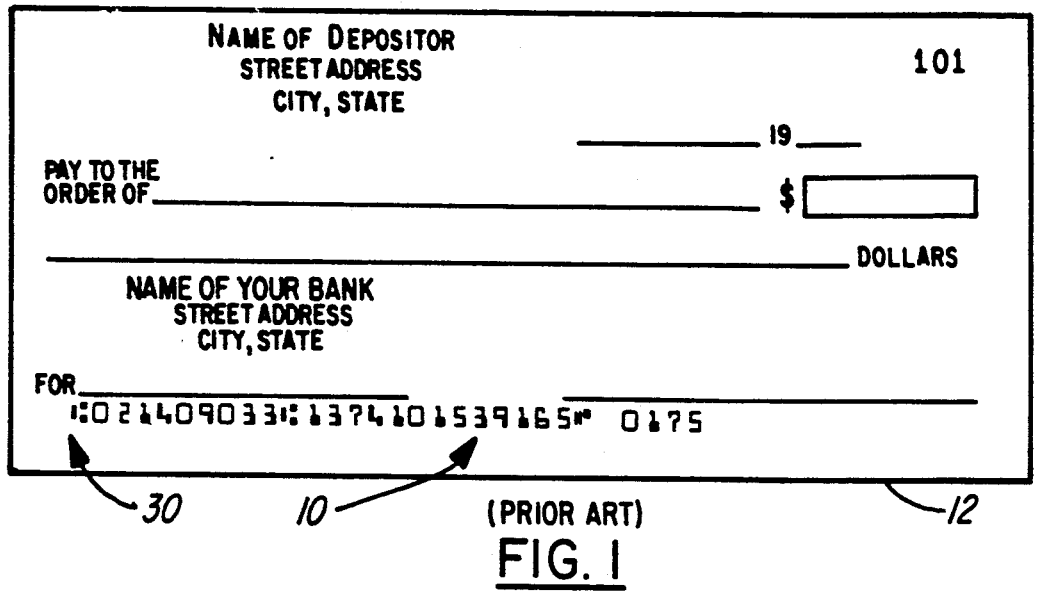
FIG. 1 is a pictorial diagram of the format of a typical personal bank check and of the MICR characters imprinted on it.

While the invention is useful for performing optical character recognition with one of many different kinds of documents, it will now be described with specific reference to the recognition of preprinted magnetic ink character recognition (MICR) symbols 10 on a personal bank check 12 illustrated in FIG. 1.

Figure 2:
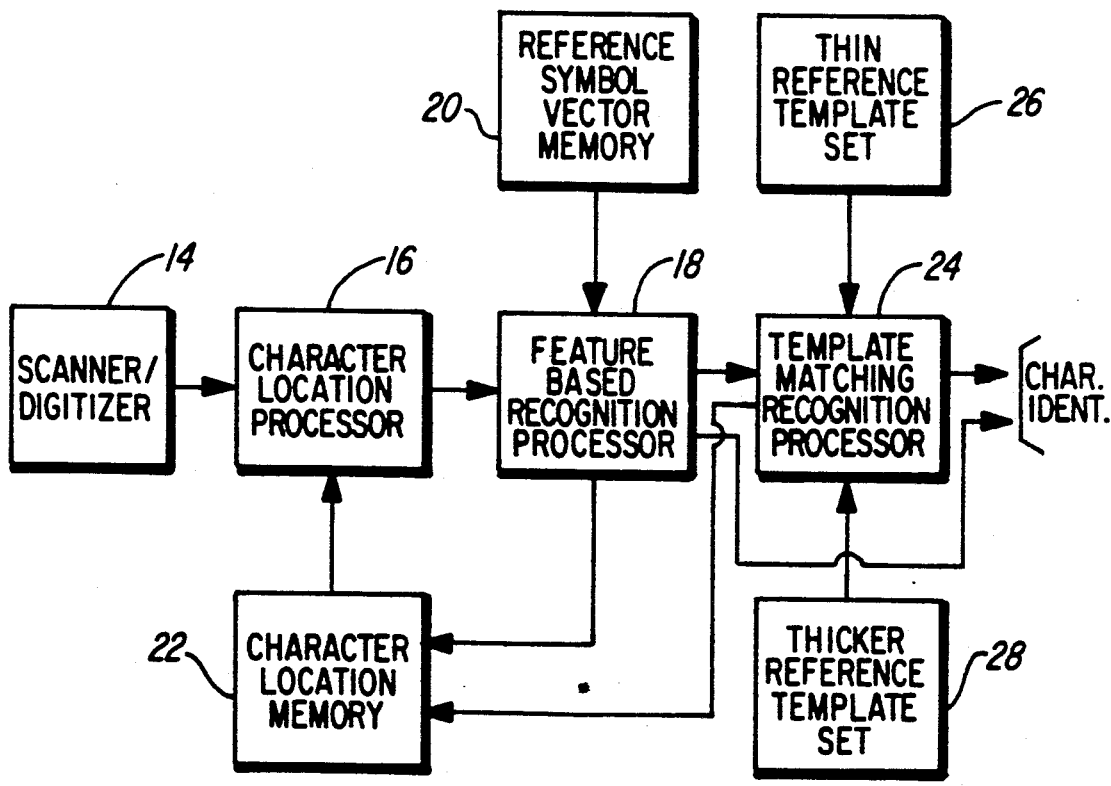
FIG. 2 is a block diagram of a preferred embodiment of the system of the invention.

The system of the invention illustrated in FIG. 2 includes a digitizer or document scanner 14 whose output is connected to a character location processor 16. The character location processor 14 locates each MICR character 10 on the document of FIG. 1. The output of the character location processor 16 is connected to a feature-based recognition processor 18.

The feature-based recognition processor 18 extracts the features of each character located by the character location processor 16 and computes the absolute distance measure between an n-dimensional vector representing the extracted features and a set of n-dimensional reference vectors representing a set of known symbols. A memory 20 connected to the feature-based recognition processor 18 stores the reference vectors. The feature-based recognition processor 18 enters the location of each character which it successfully recognizes into a character location memory 22 connected to the character location processor 16. The character location processor 16 uses the location of the previous character to estimate the location of the next character.

If the feature-based recognition processor 18 fails to identify a character with sufficient confidence, it passes the information to a template matching recognition processor 24, thus activating the template matching processor 24. The template matching processor 24 compares the image of the unknown character with each one of a set of thin reference templates stored in a template memory 26. In order to minimize the time required to perform template matching with a given character, the template matching processor 24 restricts to a minimum size the region in the image surrounding the character in which template matching is performed. If no match is found with sufficient confidence, then the template matching processor 24 enlarges the region surrounding the character in which template matching is performed. If more than one thin reference template matches the character, then the template matching processor 24 fetches the corresponding templates from a set of thicker —and therefore more demanding—reference templates stored in another template memory 28 and attempts to eliminate all but one of the possible choices using the thicker reference templates.

Location the First MICR Character

The scanner 14 produces a digitized image of the check 12 consisting of an array of horizontal rows and vertical columns of binary pixels. The first step in the optical character recognition operation performed by the system of FIG. 2 is for the character location processor 16 to locate the left-most MICR character 30 in the row of preprinted MICR characters 10 in the image of the personal check 12 of FIG. 1 To do this, the character location processor 16 locates the lower right-hand corner 32 of the check 12 in the manner illustrated in FIG. 3 by locating the bottom edge 34 and the right edge 36. The character location processor 16 then locates the leftmost MICR character 30 with respect to the lower right hand corner 32 in accordance with ANSI Specification ANSI X9.13-1983, "Specifications for the Placement and Location of MICR Printing". As illustrated in FIG. 3, the bottom edge 34 is located quickly by moving a one-dimensional horizontal edge detection mask 38 along each one of four predetermined pixel columns in the image (indicated in FIG. 3 by the X's intersecting the bottom edge 34) and noting the location in each column at which the maximum correlation between the image and the mask 38 is found. A similar process is performed to locate the right edge 36 at four predetermined pixel rows (indicated in FIG. 3 by the X's intersecting the right edge 36) by moving a vertical edge detection mask 39 along the predetermined rows and noting the location in each row at which maximum correlation between the mask and the image is found.

The process for locating each one of the edges 34, 36 is illustrated in the flow diagram of FIG. 4. First, at the four predetermined columns and rows, the character location processor 16 moves the horizontal one-dimensional edge detection mask 38 along each of the four designated pixel rows and the vertical edge detection mask 39 along each of the four designated pixel columns to locate the four points along the bottom edge 34 and the four points along the right edge 36 at the points of greatest correlation between each mask and the image. Then, using linear regression, the character location processor 16 finds the best fit for a straight line through each set of four points (block 42 of FIG. 4). It discards the farthest point from each line and repeats the linear regression step using only three lines (block 44). Finally, it solves the equations of the horizontal and vertical lines 34, 36 for the location of the corner 32 at their intersection (block 46).

Figure 5:
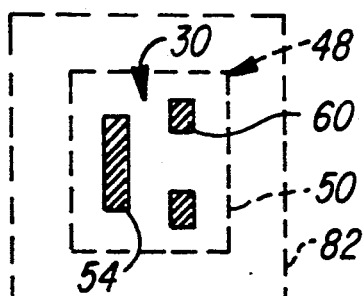
FIG. 5 is a pictorial diagram illustrating the leftmost MICR character with progressively larger dashed-line imaginary bounding boxes in the bank check of FIG. 1.

The above-referenced ANSI specifications require that the left-most MICR character be the symbol illustrated in FIG. 5 inside the dashed lines. Referring to FIG. 5, the character location processor 16 uses the above-referenced ANSI specification to define an imaginary bounding box 48 (dashed line) defining the location in the image of the check 12 of the leftmost MICR character 30. Within the bounding box 48, the exact location of the leftmost MICR character 30 is precisely determined by a process illustrated in FIG. 6. The character location processor 16 begins at the left edge 50 of the bounding box 48 (block 52 of FIG. 6) and finds the left edge 54 of the leftmost MICR character 30 by looking for a sudden increase in the number of "ON" pixels in a column as the columns are examined from left to right (block 56 of FIG. 6). If this step succeeds in finding the left edge 54 ("YES" branch of block 58 of FIG. 6), a similar step is performed to find the top edge 60 of the leftmost MICR character 30 (block 62 of FIG. 6). If this step succeeds in finding the top edge 56 ("YES" branch of block 64), the left-most MICR character 30 has been precisely located. The feature-based recognition processor 18 computes the Euclidean distance measure between the image of the leftmost MICR character 30 and the reference vectors stored in the memory 20 (block 66 of FIG. 6). The feature-based recognition processor 18 computes the ratio of the absolute distances between the vector representing the image of the leftmost character 30 and the two closest reference vectors. (The operation of the feature-based recognition processor 18 will be described below in greater detail.) If the closest reference vector corresponds to the symbol illustrated in FIG. 5 and if this ratio —referred to as a confidence value—indicates a sufficient difference between the two distances ("YES" branch of block 68 of FIG. 6), then the locations of the left and top edges 54 and 56 of the leftmost character 30 are confirmed to be correct and are stored in the character location memory 22.

If the confidence value computed by the featurebased recognition processor 18 is insufficient ("NO" branch of block 68), the slower process of template matching is employed to verify that the leftmost character 30 in the image is indeed the MICR symbol of FIG. 5 (block 70 of FIG. 6), as will be described below.

Figure 6:
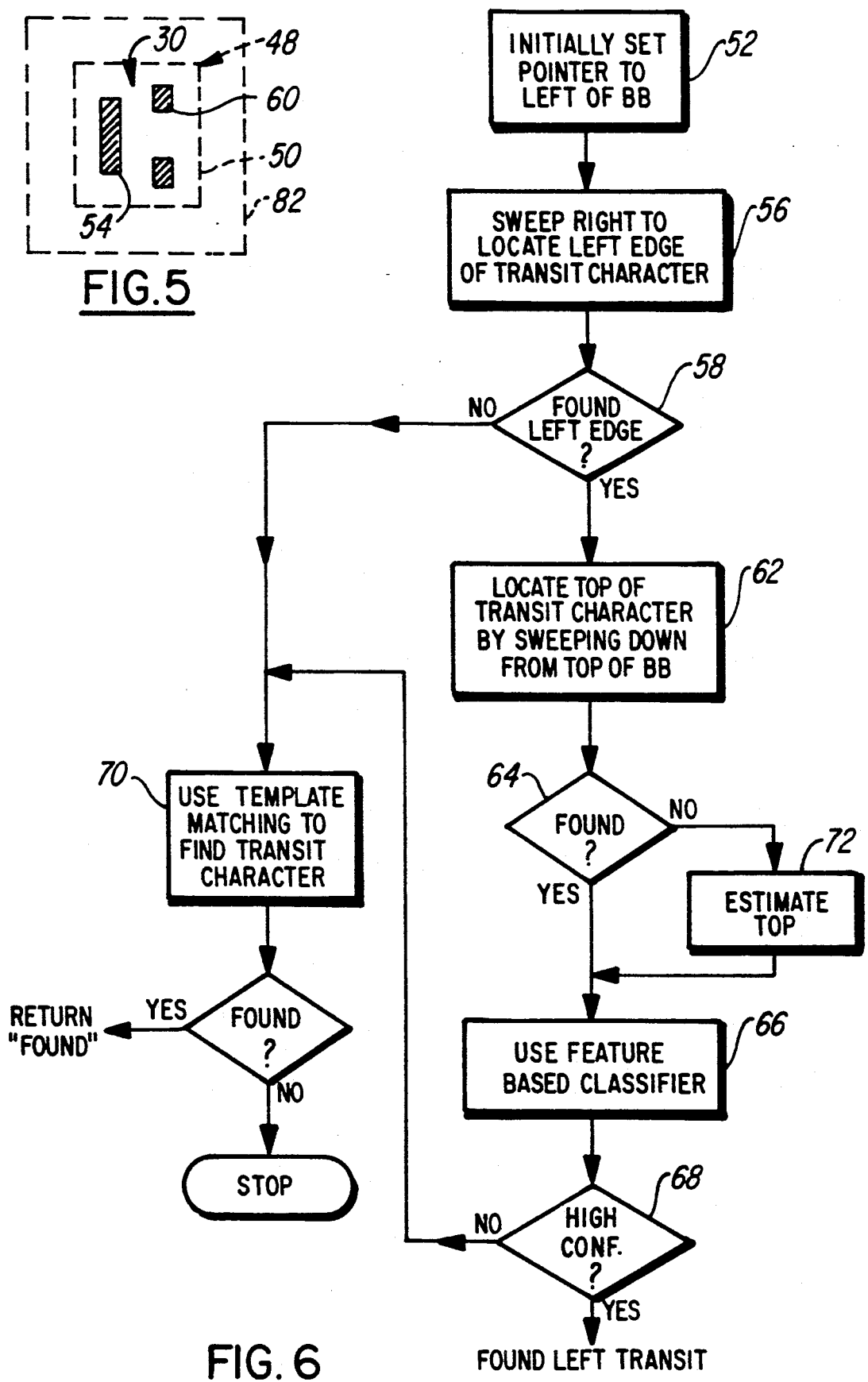
FIG. 6 is a block diagram of the process of the invention of locating the leftmost character of FIG. 5.

Returning to the step of block 62, if the top edge 60 cannot be found ("NO" branch of block 64), then the location of the top edge 60 is estimated as being displaced below the top edge of the bounding box 48 by half the difference between the height of the bounding box 48 and the specified height of the left-most MICR character illustrated in FIG. 5 (block 72 of FIG. 6). The step of block 66 is then repeated using the modified location of the top edge 60.

Returning to the step of block 56, if the left edge 54 cannot be found ("NO" branch of block 58), then the slower process of template matching is immediately employed to find the location of the left-most MICR character (block 70). If the template matching step of block 70 succeeds in identifying the image of the leftmost character 30 as the MICR symbol of FIG. 5 ("YES" branch of block 74), then the location in the image of the reference template at the point of maximum correlation with the image is stored in the character location memory 22. As will be explained below, the reference template employed in the step of block 70 is the reference template representing the MICR symbol of FIG. 5.

Figure 7:
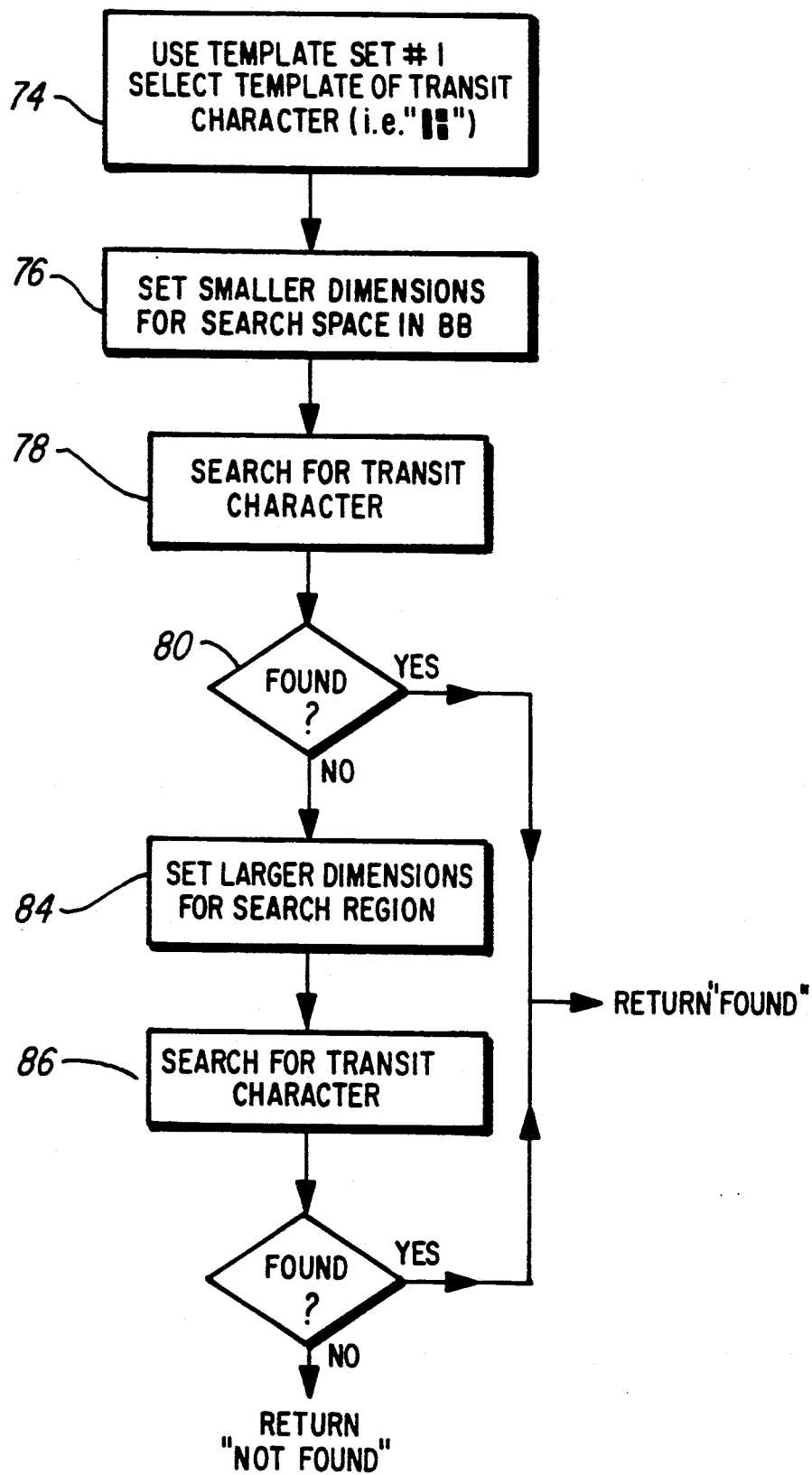
FIG. 7 is a block diagram of the template matching process of the invention.

The template matching step of block 70 is illustrated in detail in the flow diagram of FIG. 7. The template matching recognition processor 24 fetches from the thin reference template memory 26 the reference template corresponding to the MICR symbol illustrated in FIG. 5 (block 74 of FIG. 7). The bounding box 48 is then used to define the area over which the reference template is moved to find a match with the image (block 76). The search for a match is then conducted (block 78).

The step of block 78 is performed by moving the reference template horizontally and vertically one pixel at a time row by row and column by column over the region of the image within the bounding box 48 until the template has been moved to all possible locations within the box 48. At each location, the number of mismatching "OFF" pixels in the image falling within the character strokes of the reference template is compared to the total number of pixels within those character strokes. If the count falls below a threshold number or percentage, a "match" is declared. Preferably, the threshold percentage is 3% of the total number of pixels in the character strokes of the template.

If a match is declared ("YES" branch of block 80), the location of the reference mask at the point at which a match was declared is noted and stored in the character location memory. Otherwise ("NO" branch of block 80), the bounding box 48 is discarded in favor of a larger bounding box 8 shown in FIG. 5 in dashed line (block 84 of FIG. 7). The reference template is now move throughout the larger region to search for a match in the image (block 86) in the manner discussed above in connection with block 78. This second attempt would fail in all likelihood only if the printing of the personal check 12 of FIG. 1 was so poor that the location of the leftmost character 30 was in significant violation of the ANSI specifications. Thus, the process of FIG. 7 is nearly certain to find the precise location of the leftmost MICR character 30.

Reading the MICR Characters

Figure 8:
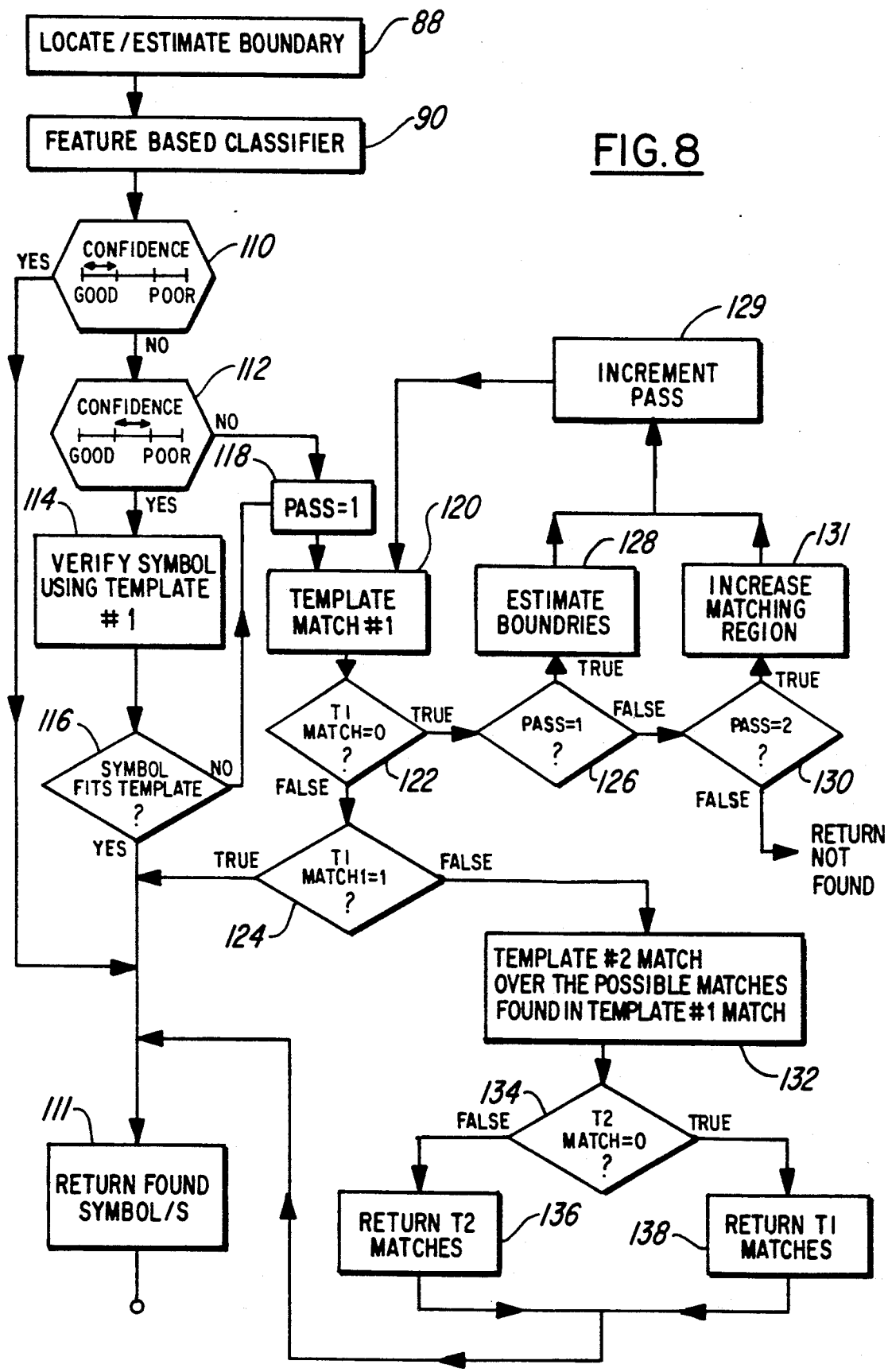
FIG. 8 is a block diagram of the character reading process of the invention.

FIG. 8 illustrates the process of the invention for reading the MICR characters 10 after the leftmost MICR character 30 has been precisely located. In the first step of the reading process, starting from left to right the character location processor 16 uses the location (stored in the character location memory 22) of the previous character 30 to find the next character. In the first instance, the previous character is the leftmost MICR character 30. The location of the next character is simply the location of the previous character shifted to the right by the pitch between characters (specified in the ANSI specifications ANSI X9.13-1983, "Specifications for the Placement and Location of MICR Printing" and ANSI X3.2-1970 (R1976), "Print Specifications for MICR"). The character location processor 16 performs this shift (block 88 of FIG. 8).

Once the next character has been precisely located, the feature-based recognition processor 18 computes the absolute distance measure between the vector representing the character image and each one of a set of reference vectors stored in the reference vector memory 20 (block 90) to produce a symbol identification and a confidence value.

Figure 9:
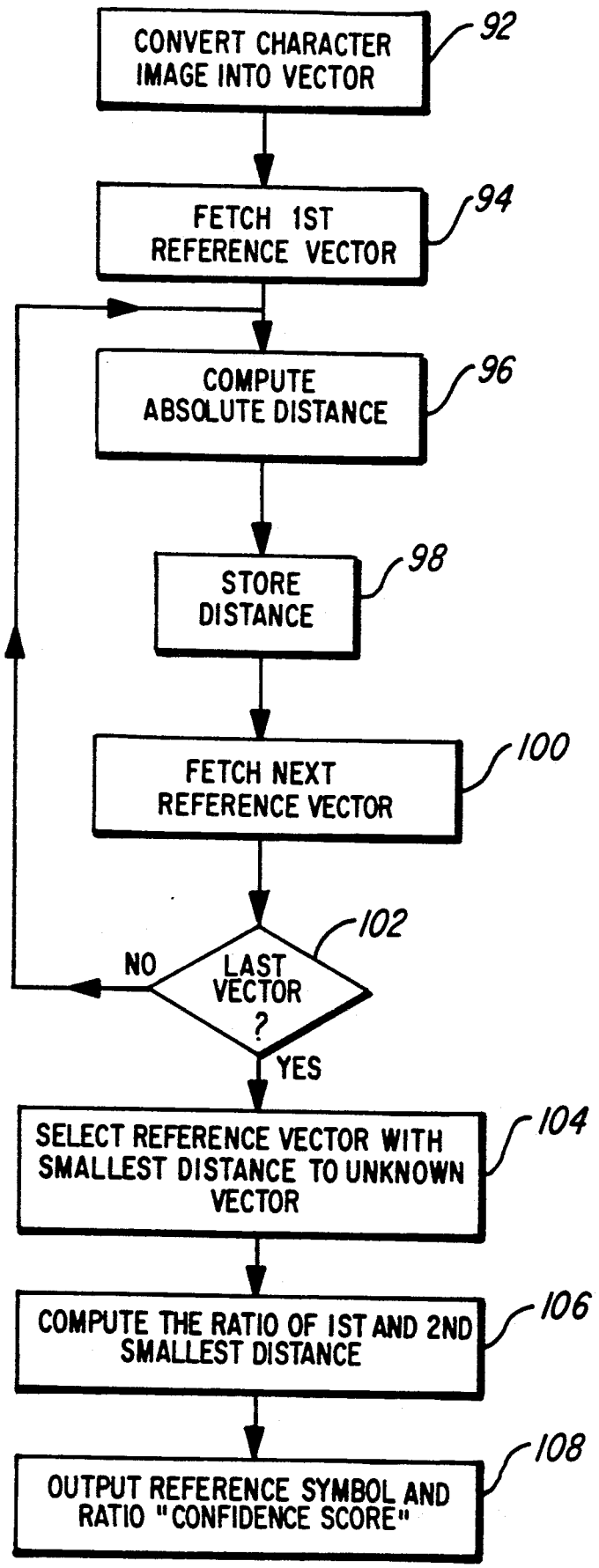
FIG. 9 is a diagram of a feature-based recognition classification process of the invention.

The step of block 90 is illustrated in detail in the flow diagram of FIG. 9. The flow diagram of FIG. 9 is best understood by reference to the diagrams of FIGS. 10a through 10e which illustrate one method for transforming the image of a character into a vector. In the example of FIG. 10, it is assumed that each character fits within an area of 18 columns and 24 rows of binary pixels. This area is divided into a square array of thirty-six squares, illustrated in FIG. 10a, each square containing 12 pixels. The image of a character such the symbol "2" of FIG. 10b is aligned with the array of FIG. 10a by aligning the corresponding top and right boundaries, as shown in FIG. 10c. The number of pixels in each one of the thirty-six squares which are within a character stroke of the character are counted. For example, FIG. 10d illustrates a number "1" aligned with the array of thirty-six squares and FIG. 10e illustrates the count in each square of pixels falling within a character stroke of the "1". The numbers illustrated in FIG. 10e are arranged in serial order row by row from left right to form the following 36-dimensional vector:

0 0 0 12 6 0 0 0 0 66 0 0 0 0 66 0 0 0 0 12 12 12 0 0 0
12 12 12 0 0 0 6 6 6.

In this manner, a vector is formed for each of the reference symbols in the character set and stored in the reference vector memory 20. Similarly, each character image is transformed to a vector. The feature-based recognition processor 18 computes the absolute distance between the vector of the character image and each one of the reference vectors. The absolute distance between two 36-dimensional vectors $(a_1, a_2, a_3, \ldots, a_{36})$ and $(b_1, b_2, b_3, \ldots, b_{36})$ is:

$$|a_1 - b_1| + |a_2 - b_2| + |a_3 - b_3| + \ldots + |a_{36} - b_{36}|.$$

Returning now to FIG. 9, the first step performed by the feature-based recognition processor 18 is to convert the character image into a vector, in the manner illustrated in FIGS. 10d and 10e (block 92 of FIG. 9). The processor 18 then fetches the first reference vector from the memory 20 (block 94), computes the absolute distance between the two vectors (block 96) and temporarily stores the difference in the memory 20 (block 98). The processor 18 then fetches the next reference vector (block 100) and repeats the process until it has been performed with all reference vectors ("YES" branch of block 102).

The processor 18 then reviews all of the absolute distances temporarily stored in the memory 20 and identifies the current character as the symbol associated with the reference vector having the shortest absolute distance from the character image vector (block 104). The processor 18 also computes the ratio between the smallest and second smallest absolute distances temporarily stored in the memory 20 (block 106) and outputs this ratio as the confidence value (block 108).

Returning now to FIG. 8, if the confidence value is above a high predetermined threshold ("YES" branch of block 110), then the symbol identification of the current character by the feature-based recognition processor 18 is deemed to be correct and the location of the current character is stored in the character location memory 22 (block 111). Otherwise ("NO" branch of block 110), if the confidence value is above a lower predetermined threshold ("YES" branch of block 112), the template matching recognition processor 24 confirms the symbol identification made by the feature-based recognition processor 18 by selecting the reference template stored in the thin template memory 26 corresponding to the identified symbol and attempting to match it with the character image (block 114). If a match is found ("YES" branch of block 116), the step of block 111 is performed. Otherwise if a match is not found ("NO" branch of block 116), or if the confidence value is not above the lower threshold ("NO" branch of block 112), the results generated by the feature-based recognition processor for the current character image are discarded.

A "PASS" flag is set to one (block 118) and the template matching processor 24 begins the slow process of comparing the character image with all of the reference templates stored in the memory 26. This process is much slower because each one of the reference templates must be compared with the character image by moving it to all possible positions in the image and the matching pixels must be counted each time each one of the reference templates is moved by one pixel in the character image. The template matching process performed here is the same as the template matching process described previously. However, this slower process is employed only as a last resort and therefore its effects are minimized in the system.

The effects of the slower template matching process are further minimized by performing the process in a small area of restricted size surrounding the character image. This small area corresponds to the bounding box 48 of FIG. 5. By so reducing the area in which template matching is performed, the number of computations performed by the template matching processor 24 is reduced.

The template matching process is performed using the thin reference template set stored in the memory 26 (block 120 of FIG. 8). This process is the same as described above in connection with block 78 of FIG. 7, except that it is performed for all of the reference templates stored in the memory 26. If a match is found ("FALSE" branch of block 122 and "TRUE" branch of block 124), the step of block 111 is performed.

If no match is found ("TRUE" branch of block 122) and if the value of the "PASS" flag is one ("TRUE" branch of block 126), the boundaries of the character —location of the bounding box surrounding the character image—are re-estimated based upon the location of the left-most character 30, the required pitch between characters and the number of characters between the left-most character 30 and the present character (block 128). The value of the PASS flag is incremented to two (block 129) and the step of block 120 is repeated.

However, if the value of the PASS flag is greater than one ("FALSE" branch of block 126) but not greater than two ("TRUE" branch of block 130), then the size of the region in which template matching is performed is increased from the size of the bounding box 48 of FIG. 5 to the size of the larger bounding box 82 of FIG. 5 (block 131). The steps of blocks 129 and 120 are then repeated in a second attempt to find a matching reference template.

Returning to the step of block 120, if more than one matching reference template is found ("FALSE" branch of block 122 and "FALSE" branch of block 124), the template matching processor 24 attempts to resolve the dilemma by noting which ones of the reference templates were found to match the character image and fetching the corresponding thicker reference templates from the other reference template memory 28. The template matching processor 24 then attempts to match each of the thicker reference template candidates with the character image (block 132). Since the thicker reference templates require more matching pixels, typically all but one of the candidates will be eliminated by this step. If more than one match is found in the step of block 132 (FALSE branch of block 134), the candidates thus identified are transmitted (block 136) to the step of block 111 to be resolved by downstream processing not a part of the present invention. If no matches were found in the step of block 132, the candidates identified in the step of block 120 are transmitted (block 138) to the step of block 111 to be resolved by downstream processing.

Figure 12A:
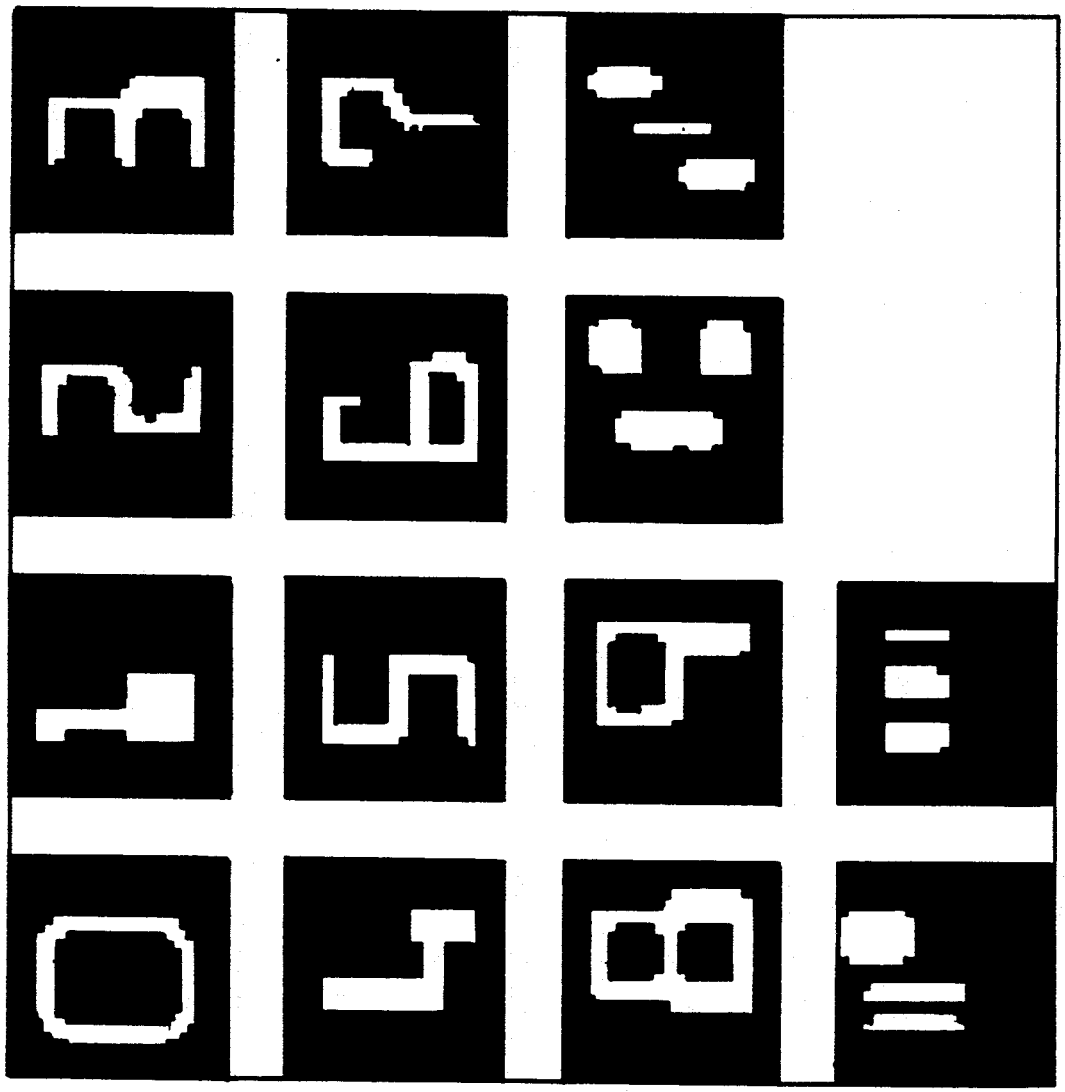
FIGS. 12a, 12b and 12c illustrate the set of MICR symbols, a thin reference template set based thereon and a thicker reference template set based thereon, used in the invention.
Figure 12B:
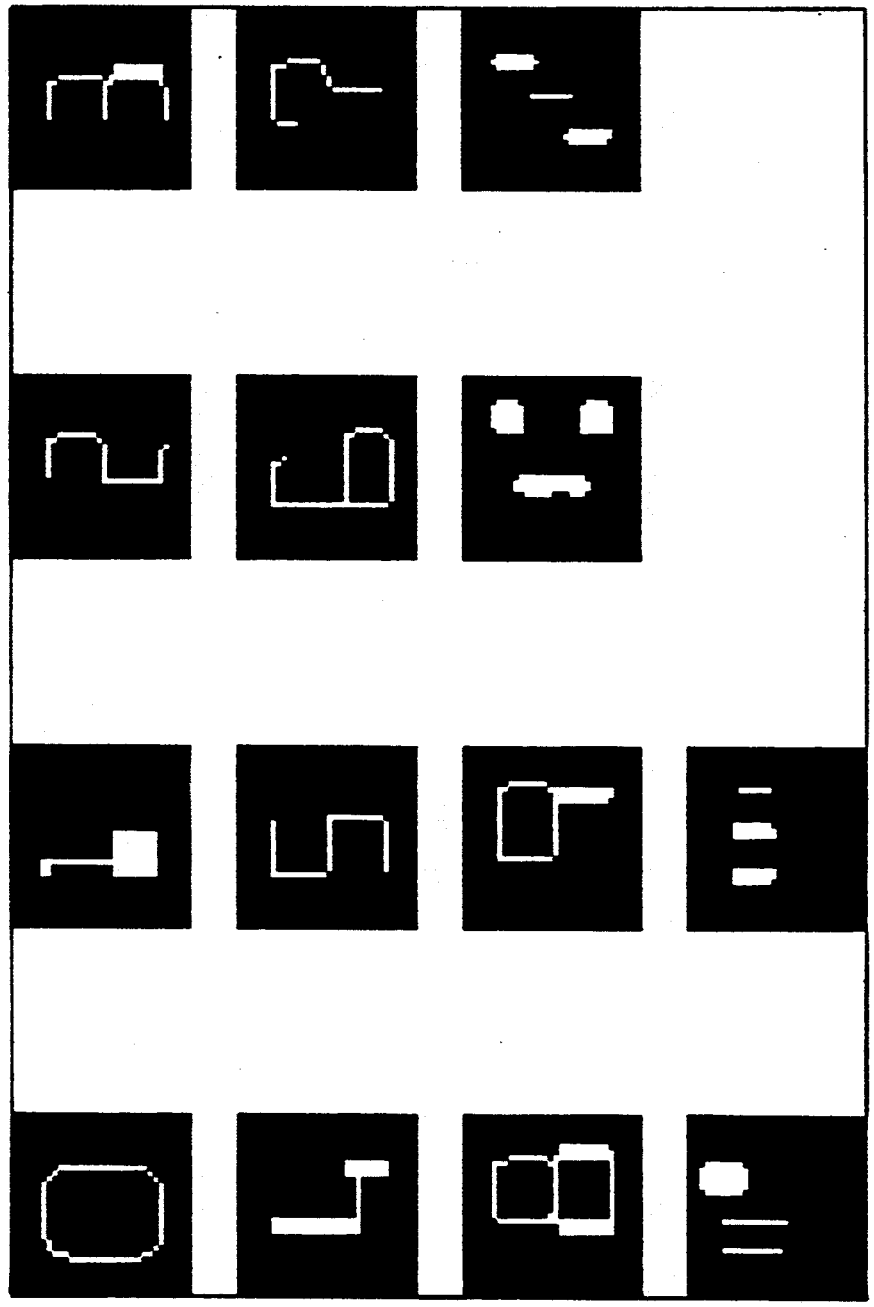
Figure 12C:
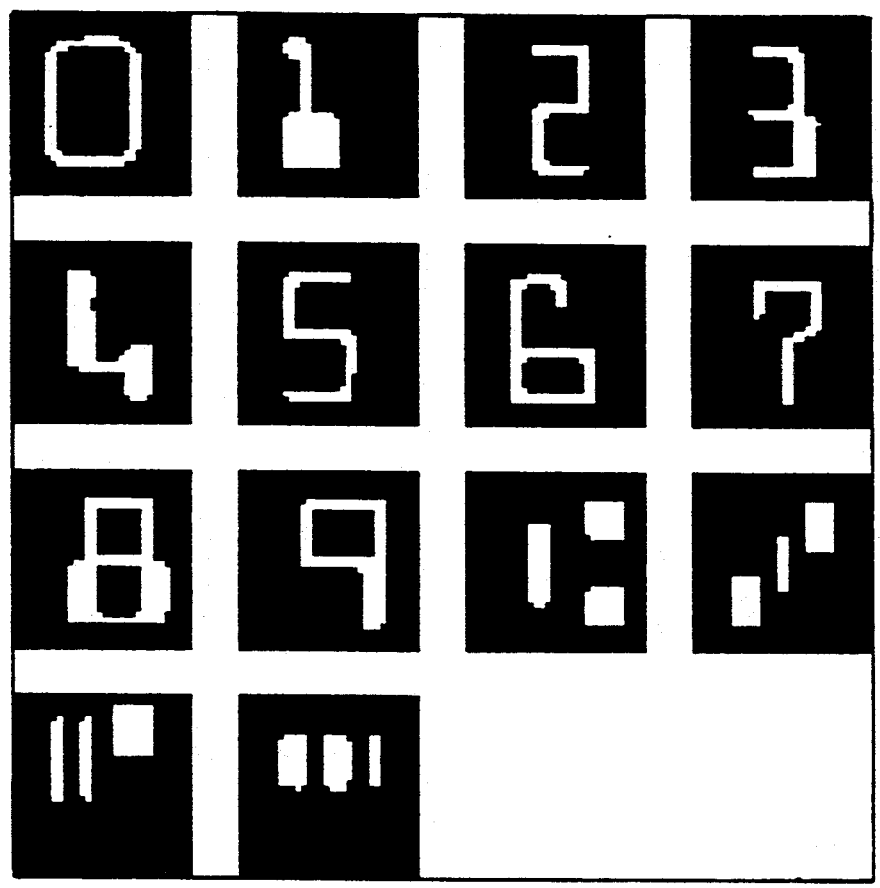

The reference templates stored in the memories 26 and 28 are formed in the manner illustrated in FIG. 11 by thinning a normal symbol. The set of MICR symbols is illustrated in FIG. 12a. The thin reference templates generated from the symbols of FIG. 12a and stored in the thin reference template memory 26 are illustrated in FIG. 12b. The templates of FIG. 12b are formed by scanning the symbols of FIG. 12a with the scanner 14 and deleting in the symbols of FIG. 12a. The set of thicker reference templates stored in the other reference template memory 28 are illustrated in FIG. 12c. The thicker templates are formed by scanning the symbols of FIG. 12a and using the same thinning procedure but requiring a lower threshold at the scanner 14 for the binary transition between black and white. For example, the templates of FIG. 12b were generated by the scanner 14 using a threshold of 20 followed by thinning, while the templates of FIG. 12c were generated by the scanner 14 using a threshold of 2 without thinning.

The template matching process of the invention is impervious to noise in the character image. Such noise may be caused by handwritten over-strikes across the MICR characters. This advantage is gained in accordance with the invention by excluding from consideration in the template matching process any pixels outside of the character strokes of the reference template. Thus, even though the character image may have "ON" pixels outside of the character strokes of the reference template—which are therefore erroneous—these pixels are simply excluded from consideration.

Figure 13:
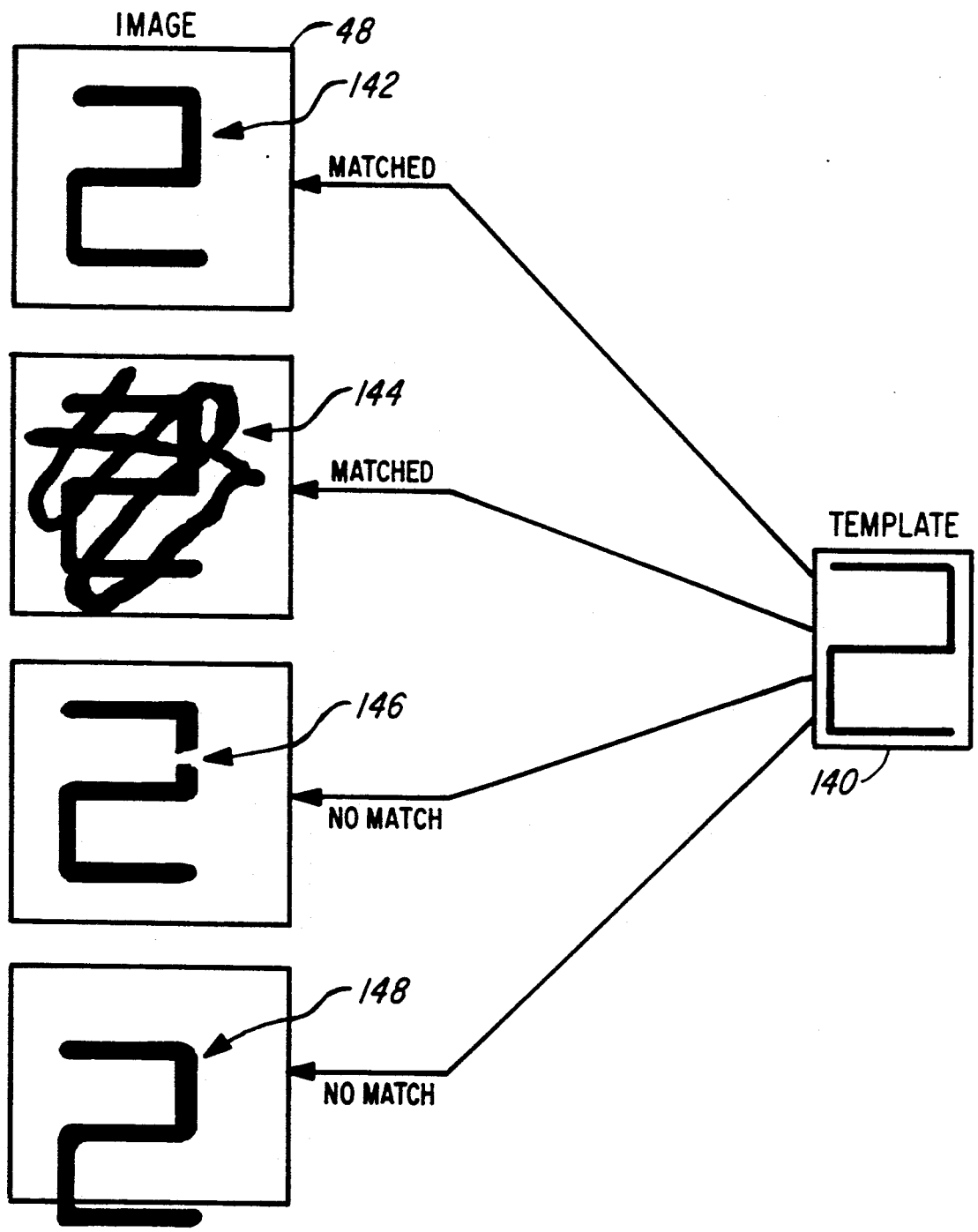
FIG. 13 is a pictorial diagram illustrating the matching of a reference template with, respectively, a normal character image, a noisy character image, a broken character image and an offset character image, in accordance with the invention.

The effect of this feature of the invention is illustrated by way of comparison in FIG. 13. The reference template 140 of a "2" matches the image 142 of a "2" centered in the bounding box 48. A match is also L 5 found with the noisy image 144 of a "2". However, no match is found between the template 140 and the broken image 146 of a "2" nor with the offset image 148 of a "2⇌.

Computer Program Listing

The invention as embodied in the system of FIG. 2 was implemented in a computer by the C-language program whose listing is given in Appendix A of this specification. Notice is hereby made that Eastman Kodak Company owns the copyright in the program listed in Appendix A.

Industrial Utilities and Advantages

The invention is particularly useful for reading the MICR characters on bank checks in an automatic banking system and provides the highest speed and reliability and is impervious to superimposed noise in the MICR characters, such as that caused by hand-written overstrikes.

While the invention has been described in detail by specific reference to preferred embodiments thereof, it is understood that variations and modifications may be made without departing from the true spirit and scope of the invention.

APPENDIX A

COPYRIGHT 1990 Eastman Kodak Company

```
/*******************************************************
This prog OPTICALLY reads the MICR numbers on checks.

It does so by first performing an edge detection for the bottom
edge of the check and then extracting and each char according to ANSI
specifictions of the micr chars.
The algorithm first performs a char classification using the
block_vector feature classification method. If the confidence
score is unsatidfactory, a template matching approach is used
for classification.
*******************************************************/ include <stdio.h>
include <math.h> define MSIZE         400    /* max number of rows */
define NSIZE         1600   /* max number of columns */
#define CHAR_VAL      0      /* binary value of pixel belonging to char */
#define MAXLIST       300    /* max number of pixels in each char template */
#define DEBUG1        0      /* enable/disable (1/0) general debugging outputs */
#define DEBUG2        0      /* output error matrix for each possible index */
#define DEBUG3        0      /* output table of char locations & conf values */
#define DEBUG4        0      /* output min dist values */
#define PX_250        50     /* number of pixels in 0.25 in */
#define PX_125        25     /* number of pixels in 0.125 in */
#define PX_91         18     /* number of pixels in 0.091 in */
#define N_START       300    /* 1st column position for hori edge detection */
#define N_SPACE       300    /* spacing between columns for hori edge det */
#define M_START       10     /* 1st row position for vert edge detection */
#define M_SPACE       30     /* spacing between rows for vert edge det */
#define X_DIST_TOLER  1.0    /* tolerance for best fit vertical edge */
#define Y_DIST_TOLER  1.0    /* tolerance for best fit horiz edge */
#define MAX_COL       800    /* max dist of vertical edge from right of image*/
#define DIST0         1143   /* # of pixels between right edge of check to left
                                of bounding box for transit character:
                                this is nominally 5.6875 in (+/- 0.0625).
                                set to [5.6875+0.0625-(0.125-0.091)]=5.716 */
#define DIST1         88     /* # of pixels between bottom edge of check to
                                top of band region for char box : 0.4375 in */
#define DIST2         1113   /* # of pixels between right edge of check to right
                                of bounding box for transit character:
                                this is nominally 5.5625. */
#define DIST3         74     /* # of pixels between bottom edge of check to
                                top of char bounding box : 0.371 in */
#define F_SZ1         3      /* size of neighborhood for template fit */
#define F_SZ2         5      /* size of neighborhood for template fit for
                                first on_us char */
#define TH_TRANS_LEFT 8      /* char pixels threshold in dectecting left of
                                transit character */

/******* These 3 should be the same as those in features.c ***********/
#define TH_TRANS_TOP  4      /* char pixels threshold in dectecting top of
                                transit character */
#define TH_CHAR_TOP   4      /*threshold in detection of top of character */
#define TH_CHAR_RIGHT 5      /*threshold in detection of right of character */
/*******************************************************/
```

```c
#define TH_CONFID1      0.5  /*below this value, no need for template fit */
#define TH_CONFID2      0.75 /*below this value, template fit for most likely
                               char only */
#define TH_FIT1         2    /*max # of error pixels in template #1 fitting */
#define TH_FIT2         4    /*max # of error pixels in template #2 fitting */
define TH_CHAR         60   /*min # of pixels to be considered a char */ unsigned char im[MSIZE][NSIZE];
int corner[2], mask[100], template1[2][MAXLIST][14], template2[2][MAXLIST][14];
int m_size, n_size, char_refs[14][36], blk[36], blk_ref[24][18];
double a_hor, b_hor, top_bnd[100], right_bnd[100];
double confid[100], dist[14];
int num_preceeding_blanks;

main()
{
  int time = 0, processing = 2;
  int sys_status;

init_block_ref();

read_char_refs();

read_template1();
  read_template2();

read_image();

/*
 * Start timing
 */
  printf("\nTiming begins ...\n");
  sys_status = lib$init_timer( &time );
  if ( sys_status != 1 )
     lib$stop( sys_status );

edge();

read_transit();

read_on_us();

/*
 *  display the processing time
 */
  sys_status = lib$show_timer( &time, &processing );
  if ( sys_status != 1 )
     lib$stop( sys_status );

} read_transit()
/*****************************************************************
   Locate the left transit symbol and
   read the 9 transit characters VARIABLES:
(1)ambig_char[x1][x2]
    0 <= x1 < number of ambiguous chars
    x2=0  specifies the position in the sequence of the given ambig char
    x2=1  specifies the number of possible indicies for the given ambig char
    x2=2...(ambig_char[x1][1]+1)  is the list of possible indicies

*****************************************************************/
{
  int i,j,m,n,index,fd;
  char tr_code[11];
  int num_indicies,poss_indx[14];
  int num_ambig, ambig_char[10][15],num_check,check_sum,sequence;
  double estimate_top(), estimate_right();

/* locate the left transit symbol */
  fd = loc_left_transit();
```

```c
  if (fd != 1){
    printf("\nleft transit char not found; fd = %d",fd);
    exit(0);
  }

/* initialize variables */
num_ambig = num_preceeding_blanks = check_sum = 0;

/* loop for each of the 9 transit characters*/
for (i=1; i < 10; ++i){ if( DEBUG1 ) printf("\ntransit character # %d",i);

num_indicies =
      read_next_char(top_bnd[i-1],right_bnd[i-1],i,poss_indx,3,2,F_SZ1,1);

if (num_indicies == 0){
    /*i.e. suitable index not found */
    tr_code[i] = 'X';
  }
  else if(num_indicies == 1){
    /* store the index */
    tr_code[i] = '0'+ poss_indx[0];

/* error check: mod 10 of straight summation with weights 3,7,1 */
    ++num_check ;
    sequence = i % 3;
    switch(sequence){
      case 1 : check_sum += 3 * poss_indx[0];
               break;
      case 2 : check_sum += 7 * poss_indx[0];
               break;
      case 0 : check_sum += poss_indx[0];
               break;
    }
  }
  else{
    /* more than 1 possible indicies found */
    tr_code[i] = '?';

/* store sequence position*/
    ambig_char[num_ambig][0] = i;

/* store number of ambiguous indicies */
    ambig_char[num_ambig][1] = num_indicies;

/* store each possible index */
    for (j=2; j <= num_indicies+1; ++j)
      ambig_char[num_ambig][j] = poss_indx[j-2];

/* increment counter for number of ambig chars */
    ++num_ambig;
  }
}

/* add initial blank and terminating char */
tr_code[0] = ' ';
tr_code[10] = '\0';

/* estimate and set location of right transit char */
right_bnd[10] = estimate_right(10);
top_bnd[10] = estimate_top(10);

/* output transit code */
printf("\n*******************************************");
printf("\nTRANSIT CODE : %s",tr_code);
if( num_ambig != 0){
  printf("\nNumber of  ambiguous characters : %d",num_ambig);
  for(i=0; i < num_ambig; ++i){
    printf("\ncharacter # %d,  possibilities are : ",ambig_char[i][0]);
    for( j=0; j< ambig_char[i][1]; ++j)
      printf("%5d",ambig_char[i][j+2]);
  }
  printf("\n");
}
```

```c
    if(num_check == 9){
      if( (check_sum % 10) == 0 ){
        printf("\nTransit code VERIFIED");
      }
      else{
        printf("\nERROR in transit code");
      }
    }
    printf("\n*******************************************\n");

/* print debugging output if required */
    if(DEBUG3){
      for (i=0;i<10;++i)
        printf("\n[%2d] %c conf=%5.2f  top=%6.1f  right=%6.1f",
               i,tr_code[i],confid[i],top_bnd[i],right_bnd[i]);
    }

} read_on_us()
/************************************************************
  Read the on_us field.
  Assumes that read_transit() has been performed
************************************************************/
{
  int i,j,m,n,index,prev_char_known;
  char on_us_code[20];
  int num_indicies,poss_indx[14];
  int num_ambig, ambig_char[19][15];
  double estimate_top(), estimate_right();

/* initialize variables */
  prev_char_known = num_preceeding_blanks = num_ambig = 0;

/* loop for each of the 19 on_us chars */
  for (i=11; i <= 29; ++i){ if( DEBUG1 ) printf("\non_us character # %d",i-11);

if( prev_char_known == 1){
      /* use smaller search region for next char */
      num_indicies =
        read_next_char(top_bnd[i-1],right_bnd[i-1],i,poss_indx,3,2,F_SZ1,0);
    }
    else {
      /* use larger search region for next char */
      num_indicies =
        read_next_char(top_bnd[i-1],right_bnd[i-1],i,poss_indx,5,3,F_SZ2,0);
    } if (num_indicies == 0){
      /* no suitable index found */
      on_us_code[i-11] = 'X';
      prev_char_known = 0;
    }
    else if(num_indicies == 1){

/* single index; store the corresponding ascii char */ prev_char_known = 1;

if(poss_indx[0] < 10){
        /* i.e. a digit */
        on_us_code[i-11] = '0'+ poss_indx[0];
        /* reset the counter for preceeding blanks to zero */
        num_preceeding_blanks = 0;
      }
      else if(poss_indx[0] == 10){
        /* i.e. an on_us symbol */
        on_us_code[i-11] = 'U';
        num_preceeding_blanks = 0;
      }
      else if(poss_indx[0] ==,11){
```

```
            /* i.e. a dash symbol */
            on_us_code[i-11] = '-';
            num_preceeding_blanks = 0;
         }
         else if(poss_indx[0] == 99){
            /* i.e. a blank */
            on_us_code[i-11] = ' ';
            /* increment counter for preceeding blanks */
            ++num_preceeding_blanks;
            prev_char_known = 0;
         }
      }
      else{
         /* several possible indicies found */
         prev_char_known = 1;
         on_us_code[i-11] = '?';
         ambig_char[num_ambig][0] = i-10;
         ambig_char[num_ambig][1] = num_indicies;
         for (j=2; j <= num_indicies+1; ++j)
            ambig_char[num_ambig][j] = poss_indx[j-2];
         ++num_ambig;
         num_preceeding_blanks = 0;
      }
   }

/* add terminating char */
   on_us_code[19] = '\0';

/* output on_us code */
   printf("\n*****************************************");
   printf("\nON_US CODE : %s",on_us_code);
   if( num_ambig != 0){
      printf("\nNumber of ambiguous characters : %d",num_ambig);
      for(i=0; i < num_ambig; ++i){
         printf("\ncharacter # %d,  possibilities are : ",ambig_char[i][0]);
         for( j=0; j< ambig_char[i][1]; ++j)
            printf("%5d",ambig_char[i][j+2]);
      }
      printf("\n");
   }
   printf("\n*****************************************\n");

/*output debug info if required */
   if(DEBUG3){
      for (i=0;i<19;++i)
         printf("\n[%2d] %c conf=%5.2f  top=%6.1f right=%6.1f",
             i+1,on_us_code[i],confid[i+11],top_bnd[i+11],right_bnd[i+11]);
   }
} read_next_char(toprow,rightcol,i,poss_indx,v_range,h_range,fit_sz,digit_only)
int i,poss_indx[],v_range,h_range,fit_sz,digit_only;
double toprow, rightcol;
/***************************************************************************
   Reads the next char. Returns the number of possible indicies for the char.

Skeleton algorithm:
       1) locate right boundary by searching; if not found, estimate it.
       2) locate top boundary by searching; if not found, estimate it.
       3) perform block counting to set up 36-element vector.
       4) if number of char pixels < TH_CHAR then it is a blank char;
          store variables and return.
       5) perform min_dist match
       6) if confidence level is insufficient, perform matching algorithm
       7) if more than 1 index was found, perform matching with 2nd set
          of templates.
       8) store variables and return the number of indicies found.

Variables
     toprow: top row of previous char
     rightcol: right col of previous char
     i: sequence index (0 - 10 for transit chars, 11 - 29 for on_us chars)
     poss_indx: array in which possible indicies for the char will be placed
```

```
    v_range: pixel range (+/- v_range) for location of char top boundary
    h_range: pixel range (+/- h_range) for location of char right boundary
    fit_sz: pixel range (+/- fit_sz) centered at [top_row,rightcol]
            for template fitting
    digit_only - the char is/is not constrained to be a digit
***************************************************************/
{
  int m,n,m1,n1,best_m,best_n;
  int index,numfit,numfit2,count;
  double top, right, estimate_top(), estimate_right();

/* set variables for previous toprow & rightcol */
  m = toprow + 0.5;
  n = rightcol + 0.5;

/* locate right boundary - approx 0.125 inches right of last boundary */
  n1 = locate_right(m,n+PX_125+h_range,n+PX_125-h_range,TH_CHAR_RIGHT,PX_125);
  if(n1==0){
    /* estimate right boundary */
    n1 = estimate_right(i) +-0.5;
    if( DEBUG1) printf("\nestimating right boundary");
  } m1 = locate_top(m+v_range,m-v_range,n1,TH_CHAR_TOP,PX_91);
  if(m1==0){
    if( DEBUG1 ) printf("\nestimating top boundary");
    m1 = estimate_top(i) + 0.5;
  }
  if(DEBUG1) printf("\nboundary: top=%d  right=%d",m1,n1);

/* compute vector for classification */
  count = blk_count(m1,n1);
  if( count < TH_CHAR){
    /* less than min #pixels classified as a blank space */
    right_bnd[i] = estimate_right(i);
    top_bnd[i] = estimate_top(i);
    numfit = 1;
    /* 99 is the code for blank space */
    poss_indx[0] = 99;
    return(numfit);
  }
  /* compute nearest distance to each reference vector */
  if(digit_only == 1){
    compute_dist(0,9);
    index = min_dist(0,9,&confid[i]);
  }
  else{
    compute_dist(0,11);
    index = min_dist(0,11,&confid[i]);
  }

/* store index obtained by block vector classification */
  numfit =1;
  poss_indx[0] = index;

if( DEBUG1 ) printf("\nconfidence value = %f",confid[i]);

/* perform template #1 fitting if necessary */
  if( confid[i] >= TH_CONFID1 && confid[i] <= TH_CONFID2 ){

/* verify that the index from vector classification is correct */
    numfit = fit_template1(m1,n1,index,index,fit_sz,poss_indx,&best_m,&best_n);

if (DEBUG1){
      printf("\nverify numfit=%d  index=%d   m=%d   n=%d", numfit,
             poss_indx[0],best_m,best_n);
    } if(numfit ==0){
      /* above verification failed - classify char using template #1 fitting */
      if(digit_only ==1)
        numfit = fit_template1(m1,n1,0,9,fit_sz,poss_indx,&best_m,&best_n);
      else
        numfit = fit_template1(m1,n1,0,11,fit_sz,poss_indx,&best_m,&best_n);
    }
```

```
    }
    else if( confid[i] > TH_CONFID2 ){

/* classify char using template #1 fit */
      if(digit_only ==1)
        numfit = fit_template1(m1,n1,0,9,fit_sz,poss_indx,&best_m,&best_n);
      else
        numfit = fit_template1(m1,n1,0,11,fit_sz,poss_indx,&best_m,&best_n);
    } if(numfit ==0){
      /* unsuccessful template fit; estimate top & right boundaries & retry */
      if(DEBUG1){
       printf(
       "\nunsuccessful template1 fit; estimate top & bottom boundaries & retry")
      }
      n1 = 0.5 + estimate_right(i);
      m1 = 0.5 + estimate_top(i);
      if(DEBUG1) printf("\nboundary: top=%d  right=%d",m1,n1);

if(digit_only == 1)
        numfit = fit_template1(m1,n1,0,9,fit_sz,poss_indx,&best_m,&best_n);
      else
        numfit = fit_template1(m1,n1,0,11,fit_sz,poss_indx,&best_m,&best_n);
    } if(numfit ==0){
      /* unsuccessful template1 fit; retry with extended tolerances */
      if(DEBUG1){
       printf(
       "\nunsuccessful template1 fit; retry with extended tolerances");
      }
      /* compute extended tolerances; range between 6-10 */
      fit_sz = 3 * num_preceeding_blanks ;
      if(fit_sz <= 3) fit_sz = 6;
      if(fit_sz > 10) fit_sz = 10;

if(digit_only == 1)
        numfit = fit_template1(m1,n1,0,9,fit_sz,poss_indx,&best_m,&best_n);
      else
        numfit = fit_template1(m1,n1,0,11,fit_sz,poss_indx,&best_m,&best_n);
    } if(numfit >= 2){
      /* more than 1 possible index found; perform template #2 fit */
      numfit2 = fit_template2(m1,n1,fit_sz,poss_indx,&best_m,&best_n,numfit);
      numfit = (numfit2 != 0)? numfit2 : numfit;
    } if( confid[i] >= TH_CONFID1){
      /* set boundary to best fit position if single template match was found */
      if( numfit == 1){
        if(DEBUG1 && (m1 != best_m || n1 != best_n))
          printf("\nboundary adjusted: [%d %d] to [%d %d]",m1,n1,best_m,best_n);
        m1 = best_m;
        n1 = best_n;
      }
    }

/* store boundary parameters */
    top_bnd[i] = m1;
    right_bnd[i] = n1;
    return (numfit);

} fit_template1(toprow,rightcol,index1,index2,range,poss_indx,p_best_m,p_best_n)
int toprow,rightcol,index1,index2,range,poss_indx[],*p_best_m,*p_best_n;
/****************************************************************************
  Perform template fitting. Returns the number of number of indicies that
  fits the given region.

Variables:
  index1 & index2: specifies the range of indicies for the fit.
``` range: region of fit is defined by [toprow +/- range, rightcol +/- range].
p_best_m: if there is a unique index, *p_best_m (or n) will contain the
         location of the fit that is spatially closest to [toprow, rightcol]
poss_indx: if number of fits >= 1, poss_indx will contain the list of all
         possible indicies.
*****************************************************************/
{
  int m,n,i,num_unfit,least_num_unfit,index,least_num_unfit_loc[2][14],least_nu
_unfit_arr[14];
  int num_unfit_array[20][20], dist1_m, dist1_n, dist2_m, dist2_n, numfit;

if(DEBUG1)printf("\nperforming fit_template1");

/* do for each index between index1 and index2 */
  for (index = index1; index <= index2; ++index){

/*initialize vars */
    least_num_unfit_loc[0][index] = 0;
    least_num_unfit_loc[1][index] = 0;
    least_num_unfit = MAXLIST;

/* for each location in the specified fit region */
    for( m = toprow-range; m <= toprow+range; ++m)
      for( n = rightcol-range; n <= rightcol+range; ++n ){

/* count the number of points that do not fit the given template */
        i = num_unfit = 0;
        do {
          if( im[ m + template1[0][i][index]][n + template1[1][i][index]] != CHA
R_VAL )
            ++num_unfit;
          ++i;
        } while( template1[0][i][index] != 9999);

/* store location of current CLOSEST best fit for the given index */
        if( num_unfit < least_num_unfit ){
          least_num_unfit = num_unfit;
          least_num_unfit_loc[0][index] = m;
          least_num_unfit_loc[1][index] = n;
          least_num_unfit_arr[index] = num_unfit;
        } else if( num_unfit == least_num_unfit){
        /* case of the same number of unfitted points; compare spatial dist */

/* compute spatial (city block) distance from [toprow,rightcol] */
          dist1_m = least_num_unfit_loc[0][index] - toprow;
          dist1_n = least_num_unfit_loc[1][index] - rightcol;
          dist2_m = m - toprow;
          dist2_n = n - rightcol;

/* take absolute values */
          dist1_m = ( dist1_m < 0)? -dist1_m : dist1_m;
          dist1_n = ( dist1_n < 0)? -dist1_n : dist1_n;
          dist2_m = ( dist2_m < 0)? -dist2_m : dist2_m;
          dist2_n = ( dist2_n < 0)? -dist2_n : dist2_n;

/* compare distances */
          if( (dist2_m+dist2_n) < (dist1_m+dist1_n) ){
            least_num_unfit_loc[0][index] = m;
            least_num_unfit_loc[1][index] = n;
          }
        } if( DEBUG2 == 1)
          num_unfit_array[m-toprow+range][n-rightcol+range] = num_unfit;

}/* end for each location */ if(DEBUG2 ==1){
      printf("\n\nnum_unfit matrix for index = %d:",index);
      for(m = 0; m <= 2*range; ++m){
        printf("\n");
        for(n = 0; n <= 2*range; ++n)
```

```
      printf("  %3d", num_unfit_array[m][n]);
    }
  }

} /* end for each index*/ numfit = check_fit(least_num_unfit_arr,index1,index2,poss_indx,TH_FIT1);

/* if single index found, store best fit location */
if(numfit ==1){
  *p_best_m = least_num_unfit_loc[0][poss_indx[0]];
  *p_best_n = least_num_unfit_loc[1][poss_indx[0]];
}
  return(numfit);
} check_fit(least_num_unfit_arr,index1,index2,poss_indx,threshold)
int least_num_unfit_arr[], index1, index2, poss_indx[],threshold;
/********************************************************************
  Searches for the entries in least_num_unfit_arr[] that are less
  than threshold. Returns the number of entries found. Found
  entries are sequentially placed in poss_indx array.
********************************************************************/

{
  int count,m;

if(DEBUG1 == 1){
    printf("\nleast num_unfits for all indicies :");
    for(m=index1; m <=index2; ++m){
      if( m%5 == 0)
        printf("\n");
      printf("[%2d] %3d  ",m,least_num_unfit_arr[m]);
    }
  }

/* count & store the number of entries below threshold */
  count =0;
  for(m=index1; m <=index2; ++m){
    if(least_num_unfit_arr[m] <= threshold){
      ++count;
      poss_indx[count-1] = m;
    }
  }

/* more than 1 char & the last is an 8; probably an 8
  if((count >= 1) && (poss_indx[count-1] == 8)){
    count = 1;
    poss_indx[0] = 8;
  } */ return( count );
} fit_template2(toprow,rightcol,range,poss_indx,p_best_m,p_best_n,num_items)
int toprow,rightcol,range,poss_indx[],*p_best_m,*p_best_n,num_items;
/********************************************************************
  Perform template fitting. Returns the number of fitted indicies.

Notes:
  (1) The templates in this case has much tighter fit "specs" than
      those in template1 matching.
  (2) The indicies to use for fitting are the first "num_items" elements in
      array poss_indx[], i.e., poss_indx[0]... poss_indx[num_items-1].

The indicies that fit are again placed sequentially in poss_indx[].
  The best spatial location of the LAST fitted char (below threshold)
  is stored in *p_best_m/n.
********************************************************************/
{
  int m,n,i,num_unfit,least_num_unfit,index;
  int dist1_m, dist1_n, dist2_m, dist2_n, numfit;
  int count,loc_m,loc_n;
```

```
    if(DEBUG1)printf("\nperforming fit_template2");

numfit = 0;
  /* for each index in poss_indx array */
  for (count = 0; count < num_items; ++count){
    index = poss_indx[count];

/* find best fit over spatial region */
    least_num_unfit = MAXLIST;
    for( m = toprow-range; m <= toprow+range; ++m)
      for( n = rightcol-range; n <= rightcol+range; ++n ){

/* count number of unfitted char points */
        i = num_unfit = 0;
        do {
          if(im[m+template2[0][i][index]][n+template2[1][i][index]]
             != CHAR_VAL ){
            ++num_unfit;
          }
          ++i;
        } while( template2[0][i][index] != 9999);

/* store best case & location */
        if( num_unfit < least_num_unfit ){
          least_num_unfit = num_unfit;
          loc_m = m;
          loc_n = n;
        }
        /* same number of unfitted char points;
           check city block dist to [toprow,rightcol] and store if better */
        else if( num_unfit == least_num_unfit){
          dist1_m = loc_m - toprow;
          dist1_n = loc_n - rightcol;
          dist2_m = m - toprow;
          dist2_n = n - rightcol;

/* convert to absolute values */
          dist1_m = ( dist1_m < 0)? -dist1_m : dist1_m;
          dist1_n = ( dist1_n < 0)? -dist1_n : dist1_n;
          dist2_m = ( dist2_m < 0)? -dist2_m : dist2_m;
          dist2_n = ( dist2_n < 0)? -dist2_n : dist2_n;
          if( (dist2_m+dist2_n) < (dist1_m+dist1_n) ){
            loc_m = m;
            loc_n = n;
          }
        }
      }
    if(DEBUG1) printf("\nindex= %d   num_unfit= %d",index,least_num_unfit);
    if( least_num_unfit <= TH_FIT2){
      poss_indx[numfit] = index;
      *p_best_m = loc_m;
      *p_best_n = loc_n;
      ++numfit;
    }
  }
  return(numfit);
} read_template1().
/*****************************************************************
  Read in the template lists for template1 fitting.
  Each template is in the form of a list terminated by 9999.
  The list specify the (m,n) displacements from [toprow,rightcol]
  where char pixels should be present.

Note the change in order of the lists between 10 to 13.
*****************************************************************/

{
int i,j,index;
char fl[80], buffer[100];
FILE *fp, *fopen();

printf("\nenter template #1 file for the 14 thinned characters : ", i);
```

```c
    scanf("%s", f1);
    printf("%s",f1);
    fp = fopen(f1, "r");
    if (fp ==0){
      printf("\ninput file error");
      exit(0);
    }

/* Read info from the ref file */
    for(i=0; i < 14; ++i){
      index = i;
      if(i == 10) index = 12;
      if(i == 11) index = 13;
      if(i == 12) index = 10;
      if(i == 13) index = 11;

/* look for XX text seperator */
      do
         fscanf(fp,"%s",buffer);
      while ( (buffer[0] != 'X') || (buffer[1] != 'X') );

j = -1;
      do{
        ++j;
        if( j == MAXLIST ){
          printf("\nmax list for char template exceeded");
          exit(0);
        }
        fscanf(fp,"%d %d", &template1[0][j][index], &template1[1][j][index]);
      }while( template1[0][j][index] != 9999);
    }
} read_template2()
/********************************************
   Read in template lists for template2 fitting
********************************************/
{
    int i,j,index;
    char f1[80], buffer[100];
    FILE *fp, *fopen();

printf("\nenter template #2 file for the 14 thinned characters : ", i);
    scanf("%s", f1);
    printf("%s",f1);
    fp = fopen(f1, "r");
    if (fp ==0){
      printf("\ninput file error");
      exit(0);
    }

/* Read info from the ref file */
    for(i=0; i < 14; ++i){
      index = i;
      if(i == 10) index = 12;
      if(i == 11) index = 13;
      if(i == 12) index = 10;
      if(i == 13) index = 11;

/* look for XX text seperator */
      do
         fscanf(fp,"%s",buffer);
      while ( (buffer[0] != 'X') || (buffer[1] != 'X') );

j = -1;
      do{
        ++j;
        if( j == MAXLIST ){
          printf("\nmax list for char template exceeded");
          exit(0);
        }
        fscanf(fp,"%d %d", &template2[0][j][index], &template2[1][j][index]);
      }while( template2[0][j][index] != 9999);
    }
}
```

```
min_dist( index1, index2, p_confid)
int index1, index2;
double *p_confid;
/****************************************************************
   Find the minumum value in  dist[] between indicies index1 & index2.
   Returns the min dist index.
   Confidence value is placed in *p_confid.
****************************************************************/
{
  int n1,n2,i;

/* find min and min-1 dist */
  n1=n2=index1;
  /* set n1 to min & n2 to max values */
  for (i=index1; i <= index2 ; ++i){
    n1 = ( dist[i] <= dist[n1])? i: n1;
    n2 = ( dist[i] >= dist[n2])? i: n2;
  }

/* set n2 to min-1 value */
  for (i=index1; i <= index2; ++i)
    n2 = ( (dist[i] <= dist[n2]) && (i != n1))? i: n2;

if( DEBUG4 )
    for (i=index1; i <= index2 ; ++i){
      printf("\n(%2d) %f", i,dist[i]);
      if( i == n1) printf("    <--- 1");
      if( i == n2) printf("    <--- 2");
    }

*p_confid = dist[n1]/dist[n2];

return(n1);
} compute_dist(index1,index2)
int index1,index2;
/****************************************************************
   Compute the absolute distance between blk[] and each of the reference
   vectors between char_refs[][index1] to char_refs[][index2].
   Output placed in dist[]
****************************************************************/
{
  int i;
  double abs_dist();

/* do for each reference vector */
  for(i=index1; i <= index2; ++i)
    dist[i] = abs_dist( blk, &char_refs[i][0] );
} double abs_dist(blk,ref)
int blk[], ref[];
{
  double t, sum;
  int j;

sum =0;
    /* compute absolute distance */
    for(j=0; j < 36; ++j){
      t = blk[j] - ref[j];
      if (t > 0)
        sum += t;
      else
        sum -= t;
    }
    return ( sum/36.0 ) ;
} read_char_refs()
/****************************************************************
   Read in the block pixel count for each of the 14
   reference characters.
```

```c
{
  int i,j;
  char f1[80], buffer[100];
  FILE *fp, *fopen();

printf("\nenter reference file for the 14 characters : ", i);
  scanf("%s", f1);
  printf("%s",f1);
  fp = fopen(f1, "r");

/* Read info from the ref file */
  for(i=0; i < 14; ++i){

/* look for XX text seperator */
    do
      fscanf(fp,"%s",buffer);
    while ( (buffer[0] != 'X') || (buffer[1] != 'X') );

for (j=0; j < 36; ++j)
      fscanf(fp,"%d",&char_refs[i][j]);
  }
  fclose(fp);
} loc_left_transit()
/***************************************************************
Locate the left transit char.

DIST0 : # of pixels between right edge of check to left
        of bounding box for transit character:
        this is nominally 5.6875 in (+/- 0.0625).
        set to [5.6875+0.0625-(0.125-0.091)]=5.716.

DIST1 : # of pixels between bottom edge of check to
        top of band region for char box : 0.4375 in.

DIST2 : Nominal # of pixels between right edge of check to right
        of bounding box for transit character: nominally 5.5625 in.

DIST3 : Nominal # of pixels between bottom edge of check to
        top of char bounding box : nominally 0.371 in.
***************************************************************/
{
  double sqrt(), d, t;
  int n_disp, m, n, m1, n1, poss_indx[14], num_indicies, best_m, best_n;
  int found_left;

/* set n to extreme left of bounding box of transit char */
  t = 1 + b_hor*b_hor ;
  n_disp = 0.5 + ( DIST0 / sqrt( t ) ) ;
  n = corner[1] - n_disp;

/* set m to bottom edge of check */
  m = a_hor + b_hor * (double) n;

/* shift m to top of band region for box */
  t = 1.0 + b_hor * b_hor;
  d = sqrt( t ) * DIST1 ;
  m -= d;

/* locate left boundary of transit character */
  n1 = locate_left(m, n + PX_125, n, TH_TRANS_LEFT, PX_250);
  if(n1 == 0){
    found_left = 0;
    if(DEBUG1)printf("\nleft boundary of transit char not found");
  }
  else
    found_left = 1;

/* perform this block only if left boundary is found; otherwise
     unpredictable things may happen during blk_count(). */
```

```
   if( found_left == 1){

/* set n1 to right boundary of transit char */
      n1 += PX_91 - 1 ;

/* set m1 to top boundary of transit char */
      m1 = locate_top( m+PX_125, m, n1, TH_TRANS_TOP, PX_91);
      if (m1 == 0){
         if(DEBUG1)printf("\ntop boundary of transit char not found; estimating");
         m1 = m + PX_125/2;
      } blk_count(m1,n1);

compute_dist(10,13);

min_dist(10,13, &confid[0]);
      num_indicies = 1;

if( DEBUG1 )
         printf("\nconfidence value for left transit char : %f",confid[0]);
   }

/* Perform template matching when left boundary not found or when
      the confidence value is too poor */ if( found_left == 0 || confid[0] > 0.7){

/* set toprow, rightcol (m,n) to nominal positions */
      t = 1 + b_hor*b_hor ;
      n_disp = 0.5 + ( DIST2 / sqrt( t ) ) ;
      n = corner[1] - n_disp;
      m = a_hor + b_hor * (double) n;
      t = 1.0 + b_hor * b_hor;
      d = sqrt( t ) * DIST3 ;
      m -= d;

/* perform template matching over 15x15 region */
      num_indicies = fit_template1(m,n,12,12,7,poss_indx,&best_m,&best_n);

if (num_indicies == 0)
         /* perform template matching over 27x27 region */
         num_indicies = fit_template1(m,n,12,12,13,poss_indx,&best_m,&best_n);

m1 = best_m;
      n1 = best_n;

if(DEBUG1){
         printf("\nnum_indicies = %d  best_index=%d  m=%d  n=%d",
                num_indicies,poss_indx[0],best_m,best_n);
      }
   }

/* left transit char is found */
   if(num_indicies == 1){
      top_bnd[0] = m1;
      right_bnd[0] = n1;
      if (DEBUG1) printf("\n[top right] coord of transit char : [%d %d]",m1,n1);
      return( num_indicies );
   }
   else{
      /*left transit not found*/
      return(0);
   }
} double estimate_right(index)
int index;
/*************************************************
Estimate current right boundary based on positions of
previous right boundaries.
*************************************************/
{
   double t;
```

```
   switch (index){ case  0: /*never occurs*/ case  1: return ( right_bnd[0] + PX_125 );
              break;

default: t = right_bnd[index-1]-right_bnd[0];
              t = ( t / (index-1.0) ) ;
              t += right_bnd[index-1] ;
              return(t);
   }
} double estimate_top(index)
int index;
/************************************************
Estimate current top boundary based on position of
previous top boundary. The direction of the bottom edge
of the check is used as reference for the estimation.
************************************************/
{
  double t;

t = top_bnd[index-1] + b_hor * PX_125 ;
  return (t);
} blk_count(top_row, right_col)
int top_row, right_col;
/************************************************
  Counts the number of char pixels in each 4x3 block of
  a 24x18 region. The top and right boundaries of
  the region are defined by top_row & right_col.
  Returns the total number of char pixels.
************************************************/

{
  int i,j,t,count;

for(i=0; i<36; ++i)
    blk[i] = 0;

/* adjust for left boundary */
  t = right_col - 17;

count = 0;
  for (i=0; i < 24; ++i)
    for(j=0; j < 18; ++j)
      if( im[i+top_row][t+j] == CHAR_VAL ){
         ++count;
         ++blk [ blk_ref[i][j] ];
      }
  return(count);
} row_pixel_count(m,n,length)
int m,n,length;
/************************************************
  Counts the number of character pixels in row m,
  beginning from column (n-length+1) and extending to
  column n.
  Returns the number of char pixels.
************************************************/

{
  int count, i;

count = 0;
  for (i=0; i<length; ++i)
    count += ( im[m][n-i] == CHAR_VAL)? 1 : 0;
  return(count);
}
```

```
locate_top(upp_m, low_m, n, threshold, length)
int upp_m, low_m, n, threshold, length;
/******************************************************
  Locate the top row of char pixels between upp_m and low_m
  Begin by scanning from the top(low_m). The first row that
  has threshold number of char pixels within length n to
  the left of column n is the top row.
  Returns the top_row or 0 if not found.
*******************************************************/

{
  int row = low_m;

while ( (row_pixel_count(row,n,length) < threshold) && (row <= upp_m) )
    ++row;

/* allowable row positions are from low_m to upp_m, inclusive */
  if( row > upp_m )
    return (0);
  else
    return(row);
} column_pixel_count(m,n,length)
int m,n,length;
/******************************************************
  Counts the number of character pixels in column n,
  beginning from row m, and extending to
  row (m+length-1).
  Returns the number of char pixels.
*******************************************************/
{
  int count, i;

count = 0;
  for (i=0; i<length; ++i)
    count += ( im[m+i][n] == CHAR_VAL)? 1 : 0;
  return(count);
} locate_right(m, upp_n, low_n, threshold, length)
int m, upp_n, low_n, threshold, length;
/******************************************************
  Locate the right boundary of char between columns
  low_n and upp_n. Scanning from right(upp_n),
  boundary is found by finding the first increment
  in the number of char pixels exceeding threshold.
  Row m is assumed to be the top row.
*******************************************************/

{
  int col, c1, c2;

col = upp_n+1;
  c1 = column_pixel_count(m, col, length);
  c2 = c1 ;

while ( (c1 - c2) < threshold  && col >= low_n ){
    --col;
    c2 = c1;
    c1 = column_pixel_count(m, col, length);
  }

/* allowable column positions are from low_n to upp_n*/
  if( col < low_n)
    return(0);
  else
    return(col);
} locate_left(m, upp_n, low_n, threshold, length)
int m, upp_n, low_n, threshold, length;
```

```
/*****************************************************
   Locate the left boundary of char between columns
   low_n and upp_n. Scanning from left (low_n),
   boundary is found by finding the first increment
   in the numb..  ..ar pixels exceeding threshold.
   Row m is assumed to be the top row.
*****************************************************/

{
  int col, c1, c2;

col = low_n - 1;
  c1 = column_pixel_count(m, col, length);
  c2 = c1 ;

while ( (c1 - c2) < threshold && col <= upp_n ){
     ++col;
     c2 = c1;
     c1 = column_pixel_count(m, col, length);
  }

/* allowable column positions are from low_n to upp_n*/
  if( col > upp_n)
    return(0);
  else
    return(col);
} edge()
/*****************************************************
   Finds the equation of the bottom edge and the corner
   point of the document.
*****************************************************/

{
  double a_ver, b_ver;
  float hor_edge(), ver_edge(), maxdist;

init_mask();

maxdist = hor_edge( N_START , 8, &a_hor, &b_hor);
  if(maxdist > Y_DIST_TOLER)
    printf("\nhorizontal edge tolerance exceeded ; maxdist = %f",maxdist);

maxdist = ver_edge( M_START , 8, &a_ver, &b_ver);
  if(maxdist > X_DIST_TOLER)
    printf("\nvert edge tolerance exceeded ; maxdist = %f",maxdist);

/* compute intersection point of edges */
  corner[1] = ( (a_ver - a_hor) / (b_hor - b_ver) ) + 0.5;
  corner[0] = ( a_hor + b_hor * corner[1] ) + 0.5 ;

if(DEBUG1){
     printf("\nedge corner = [%d %d]",corner[0],corner[1]);
     printf("\nhorizontal edge : a_hor = %f   b_hor = %f",a_hor,b_hor);
  }

} init_mask()
/* initialize convolution mask*/
{
  int i;

for(i=0; i < 50 ; ++i)
       mask[i] = 0;
     for(i= 50; i < 100 ; ++i)
       mask[i] = 1;
} float hor_edge(h_off,mask_length, p_a, p_b)
double *p_a, *p_b;
int h_off, mask_length;
/*****************************************************
```

```
   Compute the equation of the horizontal edge.
   Based on 4 sample points; first sample point
   is at column h_off.
   Equation in the form:  Y = a + bX ,
   where a = *p_a    and    b = *p_b.
   Returns 1 if satisfactory line through points
   is found.
***********************************************/

{
  int i, n;
  float x[5], y[5], maxdist, best_line();

/* Find 4 sample points */
  for(n = h_off ; n < h_off + 4*N_SPACE; n += N_SPACE){
    if( n >= n_size){
      printf("\nerror in column spacing for edge detection");
      exit(0);
    }
    i = (n - h_off) / N_SPACE;
    x[i] = n;
    y[i] = v_conv(n,mask_length);
  } maxdist = best_line(x,y,4,p_a,p_b);
  return(maxdist);
} float ver_edge(v_off,mask_length,p_a,p_b)
double *p_a, *p_b;
int v_off,mask_length;
/**********************************************
   Compute the equation of the edge.
   Based on 4 sample points; first sample point
   is at row v_off.
   Equation in the form:  Y = a + bX ,
   where a = *p_a    and    b = *p_b.
   Returns 1 if satisfactory line through points
   is found.
   Note : in order to use the regress function, the
          x,y axes have to be switched.
***********************************************/

{
  int i,j, m,n ;
  float x[5],y[5],maxdist,best_line();
  double a, b;

/* find 4 sample points */
  for(m = v_off; m < v_off + (4*M_SPACE); m += M_SPACE ){
    if( m >= m_size){
      printf("\nerror in row spacing for edge detection");
      exit(0);
    }
    i = (m-v_off)/ M_SPACE;
    y[i] = m;
    x[i] = h_conv(m,mask_length,p_a,p_b);
  }

/* Regression of X on Y */
  maxdist = best_line(y,x,4,&a,&b);

/* switch axes back to original notation
     i.e. y = a + bx
     implies   x = -(a/b) + (1/b) y
  */
  b = ( b < 0.0000000001)? 0.0000000001 : b;
  *p_a = -a/b;
  *p_b = 1.0/b;

return(maxdist);
} h_conv(m,mask_length)
int m,mask_length;
```

```
/******************************************************************
    Finds the first occurrence of the max value of a horizontal
    convolution between image and mask of length mask_length at
    row m.
    Returns the column position of the max value
******************************************************************/

{
   int max_val, val, max_val_col, n, i;
   int t1,t2;

t1 = mask_length/2;
   max_val = 0;
   for(n= n_size -1 - t1 ; n > n_size - MAX_COL ; --n){
     val= 0;
     for(i=0; i< mask_length ; ++i){
       t2 = (im[m][n-t1+i] == CHAR_VAL)? 1 : 0 ;
       val += ( mask[50-t1+i] ==0)? -t2 : t2 ;
     }

/* store current max_value */
     if(val > max_val){
       max_val = val;
       max_val_col = n;
     }
     /* stop if current max value is the largest attainable */
     if( max_val == t1) break;
   }
   return(max_val_col);
} v_conv(n,mask_length)
int n, mask_length;
/******************************************************************
    Finds the first occurrence of the max value of a vertical
    convolution between image and mask of length mask_length at
    column n.
    Returns the row position of the max value
******************************************************************/

{
   int m, max_val, val, max_val_row, i;
   int t1,t2;

t1 = mask_length/2;
   max_val = 0;
   for(m= m_size-1-t1; m > t1 ; --m){
     val= 0;
     for(i=0; i < mask_length ; ++i){
       t2 = ( im[m-t1+i][n] == CHAR_VAL )? 1 : 0;
       val += ( mask[50-t1+i] == 0)? -t2 : t2 ;
     }

/*store current max value*/
     if(val > max_val){
       max_val = val;
       max_val_row = m;
     }
     /* stop if current max is largest attainable */
     if( max_val == t1) break;
   }
   return(max_val_row);
} float best_line(x,y,n,p_a,p_b)
int n;
double *p_a, *p_b;
float x[], y[];
/******************************************************************
   Finds best line through n sample points by first performing
   a linear regression of y on x.
   The max distance sample is then discarded and regression
   is repeated using n-1 samples.
   Returns the max dist of the n-1 samples.
******************************************************************/
```

```c
{
  int worst_n,i;
  double t,max_y,sqrt();

/* find best line through n points*/
  regress (x,y,n,p_a,p_b);

/* find farthest point */
  max_y = -1;
  for ( i=0; i < n; ++i){
    t = ( *p_a + (*p_b * x[i] ) ) - y[i];
    if ( max_y < (t*t) ){
      max_y = (t*t);
      worst_n = i;
    }
  }

/* discard farthest point */
  x[worst_n] = x[n-1];
  y[worst_n] = y[n-1];

/* find best fit line through (n-1) points */
  regress(x,y,n-1,p_a,p_b);

/* find farthest point and return distance */
  max_y = -1;
  for ( i=0; i < n-1; ++i){
    t = ( *p_a + (*p_b * x[i] ) ) - y[i];
    if ( max_y < (t*t) ){
      max_y = (t*t);
      worst_n = i;
    }
  }
  max_y = sqrt( max_y );
  return ( (float) max_y );
} regress(x,y,n,p_a,p_b)
int n;
float x[], y[];
double *p_a, *p_b;
/*********************************************************
  Linear regression of y on x. (dependence of y on x)
  Finds the best fit line Y = a + b X.

Arrays x and y are n sample points, and p_a and p_b
  are pointers to a and b respectively
  (for details see text: Adv Engr Math - Kreyszig
*********************************************************/

{
  float sxy, s12, x_bar, y_bar;
  int i;

x_bar = 0;
  for (i = 0; i < n; ++i)
   x_bar += x[i];
  x_bar /= (float) n;

y_bar = 0;
  for (i = 0; i < n; ++i)
    y_bar += y[i];
  y_bar /= (float) n;

s12 = 0 ;
  for (i=0; i < n; ++i)
    s12 += ( (x[i] - x_bar) * (x[i] - x_bar) );
  s12 /= ( (float) n - 1.0 );

sxy = 0;
  for ( i=0; i < n; ++i)
    sxy += ( (x[i] - x_bar) * (y[i] - y_bar) );
  sxy /= ( (float) n - 1.0 );
```

```
  *p_b = sxy/s12;
  *p_a = y_bar - (*p_b * x_bar);
} read_image()
{
  FILE *fp1, *fopen();
  char f1[80];
  unsigned int u;
  int i,j,thres;

fp1 = 0;
  while (fp1 == 0){
    printf("\nenter infile : ");
    scanf("%s",f1);
    printf("%s",f1);
    printf("\nenter image size - #rows #cols : ");
    scanf("%d %d", &m_size, &n_size);
    printf("%d %d", m_size, n_size);
    if( m_size > MSIZE || n_size > NSIZE ){
      printf("\nerror max image dimensions [%d %d] exceeded",MSIZE,NSIZE);
      exit(0);
    }
    fp1 =fopen(f1,"r");
    if(fp1==0 )
      printf("\nfile error");
  }
  printf("\nenter threshold : ");
  scanf("%d", &thres);
  printf("%d",thres);

printf("\nReading in image .... ");
  for (i=0; i < m_size ; ++i)
    for (j=0; j < n_size ; ++j){
      u = getc(fp1);
      im[i][j] = (u > thres)? 1 : 0;
    }
  printf("\nRead complete \n");
} init_block_ref()
/****************************************************
  Assign the block labels to each pixel on a 24x18
  lattice.
****************************************************/
{
  int i,j;

for( i=0; i<24; ++i)
    for( j=0; j<18; ++j){
      if( i<4){
        if( j<3)
          blk_ref[i][j] = 0;
        else if ( j<6)
          blk_ref[i][j] = 1;
        else if ( j<9)
          blk_ref[i][j] = 2;
        else if ( j<12)
          blk_ref[i][j] = 3;
        else if ( j<15)
          blk_ref[i][j] = 4;
        else if ( j<18)
          blk_ref[i][j] = 5;
      }
      else if( i<8){
        if( j<3)
          blk_ref[i][j] = 6;
        else if ( j<6)
          blk_ref[i][j] = 7;
        else if ( j<9)
          blk_ref[i][j] = 8;
        else if ( j<12)
          blk_ref[i][j] = 9;
```

```
          else if ( j<15)
             blk_ref[i][j] = 10;
          else if ( j<18)
             blk_ref[i][j] = 11;
      }
      else if( i<12){
          if( j<3)
             blk_ref[i][j] = 12;
          else if ( j<6)
             blk_ref[i][j] = 13;
          else if ( j<9)
             blk_ref[i][j] = 14;
          else if ( j<12)
             blk_ref[i][j] = 15;
          else if ( j<15)
             blk_ref[i][j] = 16;
          else if ( j<18)
             blk_ref[i][j] = 17;
      }
      else if( i<16){
          if( j<3)
             blk_ref[i][j] = 18;
          else if ( j<6)
             blk_ref[i][j] = 19;
          else if ( j<9)
             blk_ref[i][j] = 20;
          else if ( j<12)
             blk_ref[i][j] = 21;
          else if ( j<15)
             blk_ref[i][j] = 22;
          else if ( j<18)
             blk_ref[i][j] = 23;
      }
      else if( i<20){
          if( j<3)
             blk_ref[i][j] = 24;
          else if ( j<6)
             blk_ref[i][j] = 25;
          else if ( j<9)
             blk_ref[i][j] = 26;
          else if ( j<12)
             blk_ref[i][j] = 27;
          else if ( j<15)
             blk_ref[i][j] = 28;
          else if ( j<18)
             blk_ref[i][j] = 29;
      }
      else if( i<24){
          if( j<3)
             blk_ref[i][j] = 30;
          else if ( j<6)
             blk_ref[i][j] = 31;
          else if ( j<9)
             blk_ref[i][j] = 32;
          else if ( j<12)
             blk_ref[i][j] = 33;
          else if ( j<15)
             blk_ref[i][j] = 34;
          else if ( j<18)
             blk_ref[i][j] = 35;
      }
   }
}
```

What is claimed is:

1. An optical character recognition system which uses (a) a predetermined set of reference vectors representing in a vector basis set of features a set of symbols and (b) a first set of reference templates corresponding to said set of symbols, said system comprising:

character location means for locating a first region around an individual character image among a plurality of character images in a document image;

means for generating a character vector representing in said vector basis set of features said individual character;

means for determining which one of said reference vectors has a smallest distance from said character vector and which one of said reference vectors has a next-smallest distance from said character vector;

feature-based character recognition means for computing a confidence value based upon a comparison of said smallest distance and said next-smallest distance and for associating said character image with one of said symbols corresponding to the reference vector having said smallest distance from said character vector whenever said confidence value is at least a first predetermined threshold; and template matching character recognition means responsive whenever said confidence value is below said first predetermined threshold for searching within said first region in said image around said one individual character image for a pattern of "ON" pixels matching to within at least a threshold number "ON" pixels of one of said first set of reference templates corresponding to said set of symbols.

2. The system of claim 1 wherein said template matching character recognition means comprises means responsive upon failing to find said matching pattern of "ON" pixels within said first region for searching within a second region larger than said first region surrounding said character image for said pattern of "ON" pixels.

3. The system of claim 1 wherein said template matching character recognition means comprises means responsive whenever said confidence value is above said first threshold but less than a second predetermined threshold for searching in said first region around said character image for a pattern of "ON" pixels matching to within at least a threshold number "ON" pixels of a particular one of said reference templates corresponding to the symbol identified by said feature-based character recognition means.

4. The system of claim 1 wherein said template matching character recognition means comprises means responsive whenever said character image matches more than one of said reference templates, for searching for a pattern of "ON" pixels in said first region matching to within at least a threshold number "ON" pixels of a second set of reference templates characterized by character strokes thicker than those of said first set of reference templates and corresponding only to those reference templates of said first set for which a match was found with said character image.

5. The system of claim 1 wherein said document image is characterized by a set of character images whose locations are established with reference to an image of a predetermined fiducial symbol in said set of symbols, said fiducial symbol image being located nearest one predetermined boundary of said document image, wherein:

said character location means comprises means for locating a third region in said document image around said fiducial symbol image;

said feature based character recognition means comprises means responsive upon said character location means locating said third region for computing a confidence value associated with said fiducial symbol image and one set of reference features corresponding to said fiducial symbol; and said template matching character recognition means comprises means responsive whenever said confidence value associated with said fiducial symbol image is below said first threshold for searching in said third region for a pattern of "ON" pixels matching to within at least a threshold number "ON" pixels of one reference template of said first set of reference templates corresponding to said fiducial symbol.

6. The system of claim 5 wherein said template matching character recognition means is further responsive whenever said matching pattern of "ON" pixels is not found in said third region for searching in a fourth region around said fiducial symbol image larger than said third region for said pattern of "ON" pixels.

7. The system of claim 5 wherein said set of characters are MICR characters and said document image represents a bank check.

8. The system of claim 1 wherein said predetermined set of features comprises a set of N-dimensional reference vectors representing said set of symbols and corresponding to locations of "ON" pixels in the images of said set of symbols, and wherein said feature based character recognition means comprises:

means for measuring the vector distances between an N-dimensional vector corresponding to said character image and each one of said set of N-dimensional reference vectors; and means for computing the ratio between the two shortest ones of said vector distances associated with said character image.

9. An optical character recognition method which uses (a) a predetermined set of reference vectors representing in a vector basis set of features a set of symbols and (b) a first set of reference templates corresponding to said set of symbols, comprising:

locating a first region around an individual character image among a plurality of character images in a document image;

generating a character vector representing in said vector basis set of features said individual character;

determining which one of said reference vectors has a smallest distance from said character vector and which one of said reference vectors has a next-smallest distance from said character vector;

computing a confidence value based upon a comparison of said smallest distance and said next-smallest distance and associating said character image with one of said symbols corresponding to the reference vector having said smallest distance from said character vector whenever said confidence value is at least a first predetermined threshold; and wherever said confidence value is below said first predetermined threshold, first searching within said first region in said image around said one individual character image for a pattern of "ON" pixels matching to within at least a threshold number "ON" pixels of one of said first set of reference templates corresponding to said set of symbols.

10. The method of claim 9 further comprising searching within a second region larger than said first region surrounding said character image for said pattern of "ON" pixels upon said first searching step failing to find said matching pattern of "ON" pixels within said first region.

11. The method of claim 9 further comprising the step of searching in said first region around said character image for a pattern of "ON" pixels matching to within at least a threshold number "ON" pixels of a particular one of said reference templates representing the symbol corresponding to said confidence value whenever said confidence value is above said first threshold but less than a second predetermined threshold.

12. The method of claim 9 further comprising searching for a pattern of "ON" pixels in said first region matching to within at least a threshold number "ON" pixels of a second set of reference templates characterized by character strokes thicker than those of said first set of reference templates and corresponding only to those reference templates of said first set for which a match was found with said character image whenever said character image matches more than one of said first set of reference templates.

13. The method of claim 9 wherein said document image is characterized by a set of character images whose locations are established with reference to an image of a predetermined fiducial symbol in said set of symbols, said fiducial symbol image being located nearest one predetermined boundary of said document image, wherein said character locating step comprises:

locating a third region in said document image around said fiducial symbol image;

computing a confidence value associated with said fiducial symbol image and one set of reference features corresponding to said fiducial symbol; and whenever said confidence value associated with said fiducial symbol image is below said first threshold, searching in said third region for a pattern of "ON" pixels matching to within at least a threshold number "ON" pixels of one reference template of said first set of reference template corresponding to said fiducial symbol.

14. The method of claim 13 for searching in a fourth region around said fiducial symbol image larger than said third region for said pattern of "ON" pixels whenever said matching pattern of "ON" pixels is not found in said third region.

15. The method of claim 13 wherein said set of characters are MICR characters and said document image represents a bank check.

16. The method of claim 9 wherein said predetermined set of features comprises a set of N-dimensional reference vectors representing said set of symbols and corresponding to locations of "ON" pixels in the images of said set of symbols, and wherein said computing step comprises:

measuring the vector distances between an N-dimensional vector corresponding to said character image and each one of said set of N-dimensional reference vectors; and computing the ratio between the shortest and second shortest vector distances associated with said character image.

* * * * *